US010108483B2

(12) United States Patent
El-Khamy et al.

(10) Patent No.: US 10,108,483 B2
(45) Date of Patent: Oct. 23, 2018

(54) COMPUTING SYSTEM WITH ERROR HANDLING MECHANISM AND METHOD OF OPERATION THEREOF

(71) Applicant: Samsung Electronics Co., Ltd., Suwon-si, Gyeonggi-Do (KR)

(72) Inventors: Mostafa El-Khamy, San Diego, CA (US); Jungwon Lee, San Diego, CA (US); Inyup Kang, San Diego, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 275 days.

(21) Appl. No.: 14/465,694

(22) Filed: Aug. 21, 2014

(65) Prior Publication Data

US 2015/0058694 A1    Feb. 26, 2015

Related U.S. Application Data

(60) Provisional application No. 61/870,029, filed on Aug. 26, 2013.

(51) Int. Cl.
*G06F 11/10* (2006.01)
(52) U.S. Cl.
CPC .................................. *G06F 11/10* (2013.01)
(58) Field of Classification Search
CPC .... G06F 11/10; H04L 27/2627; H04L 1/0041; H04L 1/0052; H04L 1/0057; H04L 1/0058; H04L 1/0065; H04L 27/2602; H04L 27/2647; H04L 27/2655; H04L 27/36; H04N 21/236; H04N 21/2383; H03M 13/00

See application file for complete search history.

(56) References Cited

U.S. PATENT DOCUMENTS

| 7,168,030 | B2 | 1/2007 | Ariyoshi |
| 7,349,496 | B2 | 3/2008 | Jia et al. |
| 8,358,987 | B2 | 1/2013 | Mathew et al. |
| 8,358,988 | B2 | 1/2013 | Martinot et al. |
| 2001/0010089 | A1 | 7/2001 | Gueguen |
| 2003/0126551 | A1* | 7/2003 | Mantha .............. H03M 13/1102 714/790 |

(Continued)

OTHER PUBLICATIONS

Wang, R.; Wanlun Zhao; Giannakis, G.B., "CRC-assisted error correction in a convolutionally coded system", Communications, IEEE Transactions on , vol. 56, No. 11, pp. 1807,1815, Nov. 2008.

(Continued)

*Primary Examiner* — Kyle Vallecillo
(74) *Attorney, Agent, or Firm* — Perspectives Law Group, Corp.

(57) ABSTRACT

A computing system includes: an inter-device interface configured to access a destination signal including an information portion for representing a content and an error-handling portion for describing the information portion relative to the content; a communication unit, coupled to the inter-device interface, configured to: generate a parity-check parameter based on a sparse configuration from the destination signal, and estimate the content based on decoding the information portion using the error-handling portion and the parity-check parameter.

12 Claims, 8 Drawing Sheets

(56) References Cited

U.S. PATENT DOCUMENTS

| | | | |
|---|---|---|---|
| 2008/0080444 A1 | 4/2008 | Fisher-Jeffes et al. | |
| 2008/0080542 A1 | 4/2008 | Vishwanathan et al. | |
| 2012/0192042 A1 | 7/2012 | Buckley | |
| 2013/0031440 A1* | 1/2013 | Sharon | G06F 11/1012 714/758 |
| 2013/0191706 A1 | 7/2013 | Zopf | |
| 2013/0191707 A1 | 7/2013 | Zopf | |
| 2013/0272291 A1 | 10/2013 | Mukherjee et al. | |
| 2013/0311858 A1 | 11/2013 | Ramesh et al. | |
| 2014/0153625 A1* | 6/2014 | Vojcic | H04L 1/005 375/224 |
| 2015/0358648 A1* | 12/2015 | Limberg | H04L 27/2627 725/109 |

OTHER PUBLICATIONS

El-Khamy, M.; McEliece, R.J., "Iterative algebraic soft-decision list decoding of Reed-Solomon codes", Selected Areas in Communications, IEEE Journal on , vol. 24, No. 3, pp. 481,490, Mar. 2006.
3GPP, "Evolved Universal Terrestial radio access (E-UTRA); multiplexing and channel coding (Release 10)", TS 36,212, 2011.
R.Seshadri and M. Valenti, "An Iterative Joint Source-Channel Decoder".
R.Wang, W.Zhao, and G.Giannakis, "CRC-Assisted Error Correction in a Convolutionally Coded System", IEEE Transactions on Communications, vol. 56, No. 11, pp. 1807-1815, Nov. 2008.
K.Kim, S.Kang, M.Mohaisen, and K.Chang, "Iterative Detection and Decoding (IDD) MIMO-OFDM HARQ Algorithm with Antenna Scheduling".
C.Dubuc, "Joint Iterative Demodulation and Decoding for Turbo-Coded PSK Signals on Flat Fading Channels".

* cited by examiner

US 10,108,483 B2

COMPUTING SYSTEM WITH ERROR HANDLING MECHANISM AND METHOD OF OPERATION THEREOF

CROSS-REFERENCE TO RELATED APPLICATION(S)

This application claims the benefit of U.S. Provisional Patent Application Ser. No. 61/870,029 filed Aug. 26, 2013, and the subject matter thereof is incorporated herein by reference thereto.

TECHNICAL FIELD

An embodiment of the present invention relates generally to a computing system, and more particularly to a system with error handling mechanism.

BACKGROUND

Modern consumer and industrial electronics, especially devices such as cellular phones, navigations systems, portable digital assistants, and combination devices, are providing increasing levels of functionality to support modern life including mobile communication. Research and development in the existing technologies can take a myriad of different directions.

The increasing demand for information in modern life requires users to access information at any time, at increasing data rates. However, telecommunication signals used in mobile communication effectively experience various types of interferences from numerous sources, as well as computational complexities rising from numerous possible formats for communicated information, which affect the quality and speed of the accessible data.

Thus, a need still remains for a computing system with error handling mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a computing system, including: an inter-device interface configured to access a destination signal including an information portion for representing a content and an error-handling portion for describing the information portion relative to the content; a communication unit, coupled to the inter-device interface, configured to: generate a parity-check parameter based on a sparse configuration from the destination signal, and estimate the content based on decoding the information portion using the error-handling portion and the parity-check parameter.

An embodiment of the present invention provides a method of operation of a computing system including: accessing a destination signal including an information portion for representing a content and an error-handling portion for describing the information portion relative to the content; generating a parity-check parameter based on a sparse configuration from the destination signal; and estimating the content based on decoding the information portion using the error-handling portion and the parity-check parameter.

An embodiment of the present invention provides a non-transitory computer readable medium including instructions for operating a computing system including: accessing a destination signal including an information portion for representing a content and an error-handling portion for describing the information portion relative to the content; generating a parity-check parameter based on a sparse configuration from the destination signal; and estimating the content based on decoding the information portion using the error-handling portion and the parity-check parameter.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
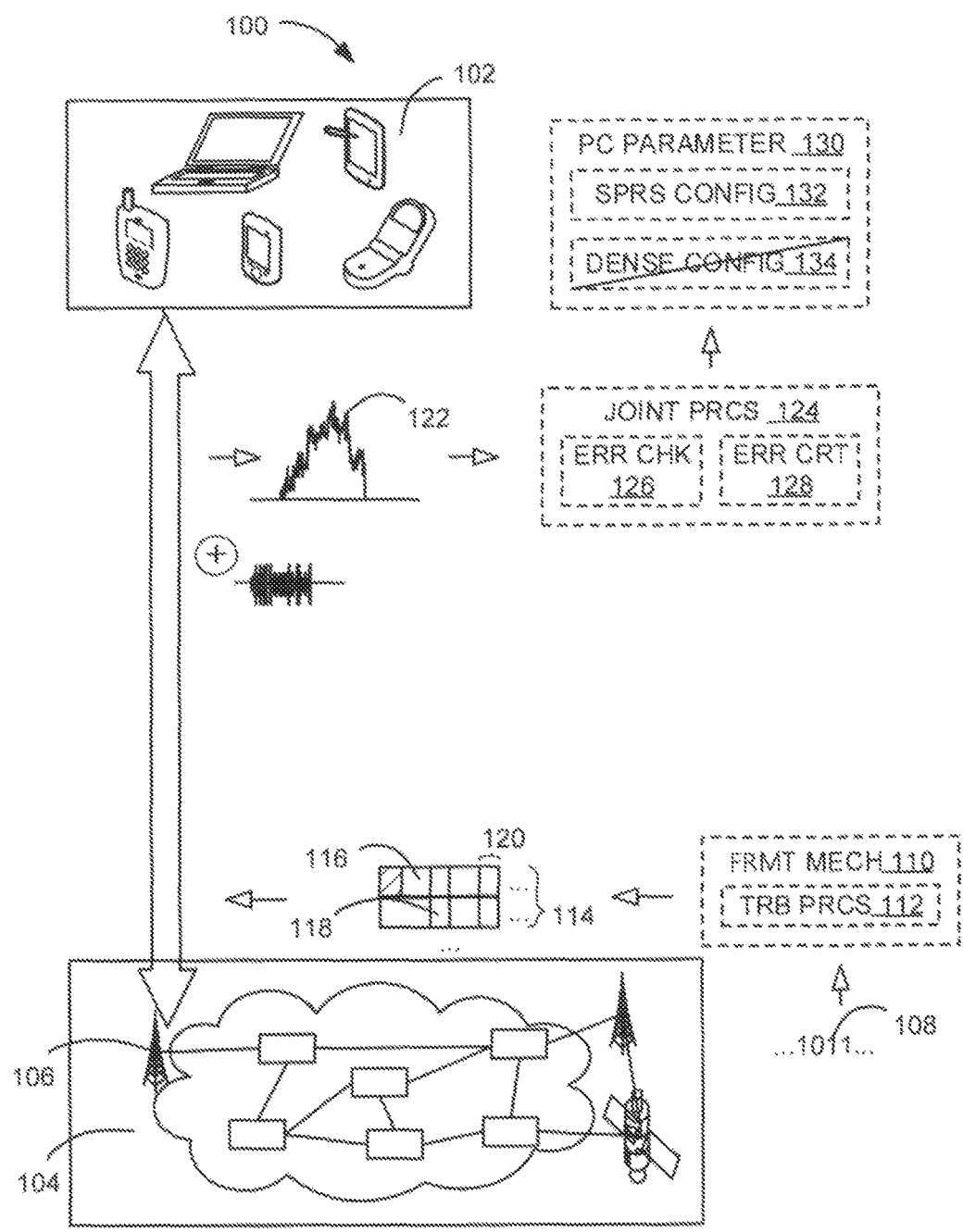
FIG. 1 is a computing system with error handling mechanism in an embodiment of the present invention.

The following embodiments of the present invention can be used to process for content from destination signal. The destination signal can be decoded using an error-handling portion included therein and an error correction process. The error correction process using the error-handling portion can generate a parity-check parameter including or based on a sparse configuration using a joint processing mechanism.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

The term "module" referred to herein can include or be implemented as software, hardware, or a combination thereof in the present invention in accordance with the context in which the term is used. For example, the software can be machine code, firmware, embedded code, and application software. The software can also include a function, a call to a function, a code block, or a combination thereof. Also for example, the hardware can be gates, circuitry, processor, computer, integrated circuit, integrated circuit cores, a pressure sensor, an inertial sensor, a microelectromechanical system (MEMS), passive devices, physical non-transitory memory medium having instructions for performing the software function, a portion therein, or a combination thereof.

The term "processing" as used herein includes manipulating signal and corresponding data, such as filtering, detecting, decoding, assembling data structures, transferring data structures, manipulating data structures, and reading and writing data structures. Data structures are defined to be information arranged as symbols, packets, blocks, files, input data, system generated data, such as calculated or generated data, and program data.

Referring now to FIG. 1, therein is shown a computing system 100 with error handling mechanism in an embodiment of the present invention. The computing system 100 includes a first device 102, such as a mobile device including a cellular phone or a notebook computer, connected to a network 104. The first device 102 can further include a wired device, such as a modem or a router. The first device 102 can further include a circuit or a device within a comprehensive device, such as a portion or circuit specializing in processing information within a storage device or system.

The network 104 is a system of wired or wireless communication devices or means that are connected to each other for enabling communication between devices. For example, the network 104 can include a combination of wires, transmitters, receivers, antennas, towers, stations, repeaters, telephone network, servers, or client devices for a wireless cellular network. The network 104 can also include a combination of routers, cables, computers, servers, and client devices for various sized area networks. Also for example, the network 104 can include a communication bus, a wire, a cable, a wireless connection, or a combination thereof between units within a device.

The computing system 100 can include a second device 106 for directly or indirectly linking and communicating with the first device 102. The network 104 can include or couple to the second device 106. The second device 106 can receive wireless signals from the first device 102, transmit signals to the first device 102, process signals, or a combination thereof. The second device 106 can also relay signals between other base stations, components within the network 104, or a combination thereof.

The first device 102 can be connected to the network 104 through the second device 106. For example, the second device 106 can be a base station, a server, a router, a modem, or a combination thereof. Also for example, the second device 106 can be a communication device or a processing component included or with a cell tower, a wireless router, an antenna, or a combination thereof being used to communicate with, such as by sending signals to or receiving signals from, the first device 102 including a mobile computing device. Also for example, the second device 106 can include a portion or circuit specializing in storing information within the storage device or system.

The first device 102 can connect to and communicate with other devices, such as other mobile devices, servers, computers, telephones, or a combination thereof. For example, the first device 102 can communicate with other devices by transmitting signals, receiving signals, processing signals, or a combination thereof and displaying a content of the signals, audibly recreating sounds according to the content of the signals, processing according to the content, such as storing an application or updating an operating system, or a combination thereof.

The second device 106 can be used to wirelessly exchange signals for communication, including voice signals of a telephone call or data representing a webpage and interactions therewith. The second device 106 can also transmit reference signals, training signals, error detection signals, error correction signals, header information, transmission format, protocol information, or a combination thereof.

Based on the communication method, such as code division multiple access (CDMA), orthogonal frequency-division multiple access (OFDMA), Third Generation Partnership Project (3GPP), Long Term Evolution (LTE), or fourth generation (4G) standards, the communication signals can include a reference portion, a header portion, a format portion, an error correction or detection portion, or a combination thereof imbedded in the communicated information. The reference portion, header portion, format portion, error correction or detection portion, or a combination thereof can include a predetermined bit, pulse, wave, symbol, or a combination thereof. The various portions can be embedded within the communicated signals at regular time intervals, frequency, code, or a combination thereof.

For illustrative purposes, the computing system 100 will be described as a communication system with the first device 102 as a user equipment, such as a mobile device, and the second device 106 as a base station or a transmission node. However, it is understood that the computing system 100 can be different, such as a memory system with the first device 102 as a processing portion in a disc drive or a device focusing on processing in a memory system, and the second device 106 as a storage portion in the disc drive or a device focusing on storing in the memory system.

The computing system 100 can process content 108. The content 108 can include data intended for accessing, processing, communicating, or a combination thereof. For example, the second device 106 can communicate the content 108 intended for the first device 102. The content 108 can include data from a transmitting device intended for communication by reproduction or processing at a receiving device. As a more specific example, the content 108 can be a sequence of bits intended for displaying, audibly recreating, executing instructions, storing, or a combination thereof at a receiving device, such as the first device 102.

The computing system 100 can utilize a formatting mechanism 110. The formatting mechanism 110 can include a process or a method for sequencing, adding, removing, generating additional information, or a combination thereof for processing the content 108. The formatting mechanism 110 can include a coding scheme, a modulation coding scheme, or a combination thereof.

For example, the formatting mechanism 110 can include modulation-coding scheme (MCS), amplitude modulation scheme, phase-shift keying scheme, a derivation thereof, or a combination thereof. Also for example, the formatting mechanism 110 can include a polar coding scheme, low-density parity-check (LDPC) coding mechanism, or a turbo processing mechanism 112 for implementing turbo coding scheme. The turbo processing mechanism 112 can utilize a-priori, a-posterior, and extrinsic data, interleaving, or a combination thereof to process information.

The computing system 100 can include a source signal 114. The source signal 114 can include information intended or designated for communication. The source signal 114 can include transmitted instance of the content 108 from a device intended for a different device. For example, the source signal 114 can include a communication signal transmitted by the second device 106 intended for communicating the content 108 with the first device 102.

The source signal 114 can further include stored information initially stored, intended for access, or communication with the user. For example, the source signal 114 can include the content 108 stored in or recalled from the second device 106 for access or interaction through the first device 102.

The source signal 114 can include an information portion 116, an error-handling portion 118, or a combination thereof. The information portion 116 can include the content 108 or a portion thereof. The error-handling portion 118 can include information for verifying accuracy of the information portion 116. The error-handling portion 118 can include information derived from or associated with the information portion 116. The information portion 116 and the error-handling portion 118, or a derivation thereof can be combined to determine the accuracy of the information portion 116 or the content 108.

For example, the error-handling portion 118 can include cyclic-redundancy-check (CRC) mechanism 120. The cyclic-redundancy-check mechanism 120 can include a specific process or a specific method for utilizing error-detecting code to detect accidental or unintended changes to intended or raw data. The cyclic-redundancy-check mechanism 120 can generate the error-handling portion 118. The cyclic-redundancy-check mechanism 120 can generate the error-handling portion 118 based on or according to the information portion 116.

The computing system 100 can process a destination signal 122. The destination signal 122 can include information accessed or received by the intended device. The destination signal 122 can include the information portion 116, the error-handling portion 118, a derivation thereof, or a combination thereof. For example, the destination signal 122 can be signal corresponding to the source signal 114 received by the first device 102.

The destination signal 122 can be different from the source signal 114. For example, the source signal 114 can be changed due to communication channel, such as due to delays, reflections, fading, phase shift, or a combination thereof to be received as the destination signal 122.

Also for example, the source signal 114 can be changed due to noise, interference signal, cross talk, or a combination thereof and accessed as the destination signal 122. Also for example, the source signal 114 can be changed due to degradation during storage, erroneous access, noise, cross talk, or a combination there to be accessed as the destination signal 122.

The computing system 100 can process the destination signal 122 using a joint processing mechanism 124. The joint processing mechanism 124 is a process or a method for combining error detection and error correction in processing information. For example, the joint processing mechanism 124 can use the error-handling portion 118 to correct the information portion 116 along with verifying the accuracy of the information portion 116.

The joint processing mechanism 124 can combine an error check process 126 and an error correction process 128. The error check process 126 is a set of instructions or actions for verifying accuracy of specific information. The error check process 126 can be for verifying the accuracy of the destination signal 122 or verifying an estimation of the content 108 from the destination signal 122. For example, the error check process 126 can include verification of the information portion 116 using the error-handling portion 118 according to the cyclic-redundancy-check mechanism 120.

The error correction process 128 is a set of instructions or actions for undoing changes in the destination signal 122 to recover the content 108. The error correction process 128 can include coding or decoding process, such as according to the formatting mechanism 110.

The computing system 100 can generate a parity-check parameter 130 according to the joint processing mechanism 124. The parity-check parameter 130 can include a value or a parameter for verifying the accuracy of the information. The parity-check parameter 130 can be applied to the information portion 116 the error-handling portion 118, or a combination thereof to verify the accuracy of the information portion 116 relative to the content 108 originally intended by the information portion 116.

The parity-check parameter 130 can be for the error check process 126. The computing system 100 can additionally generate and use the parity-check parameter 130 for the error correction process 128 according to the joint processing mechanism 124.

The parity-check parameter 130 can be based on sparse configuration 132, dense configuration 134, or a combination thereof. The sparse configuration 132 is an arrangement including a distance between intended or significant information. The dense configuration 134 is an arrangement including abutting or sequential placement of intended or significant information. The dense configuration 134 can be an opposite of the sparse configuration 132. As an example, the parity-check parameter 130 can be calculated or generated based on the sparse configuration 132 along with or without the dense configuration 134.

The sparse configuration 132 can include the distance separating the intended or significant information predetermined by the computing system 100. For example, the sparse configuration 132 can be based on insignificant or filler values or parameters between values, separation between stored locations, or a combination thereof.

The computing system 100 can use the parity-check parameter 130 including the sparse configuration 132 according to the joint processing mechanism 124 to process for the content 108 from the destination signal 122. Details regarding the joint processing mechanism 124, the parity-check parameter 130, or a combination thereof is described below.

For illustrative purposes, the computing system 100 is described as sending information from the second device 106 to the first device 102. However, it is understood that the first device 102 can send information to the second device 106 with the second device 106 processing with the error-handling portion 118, such as for the base stations on the uplink.

Figure 2:
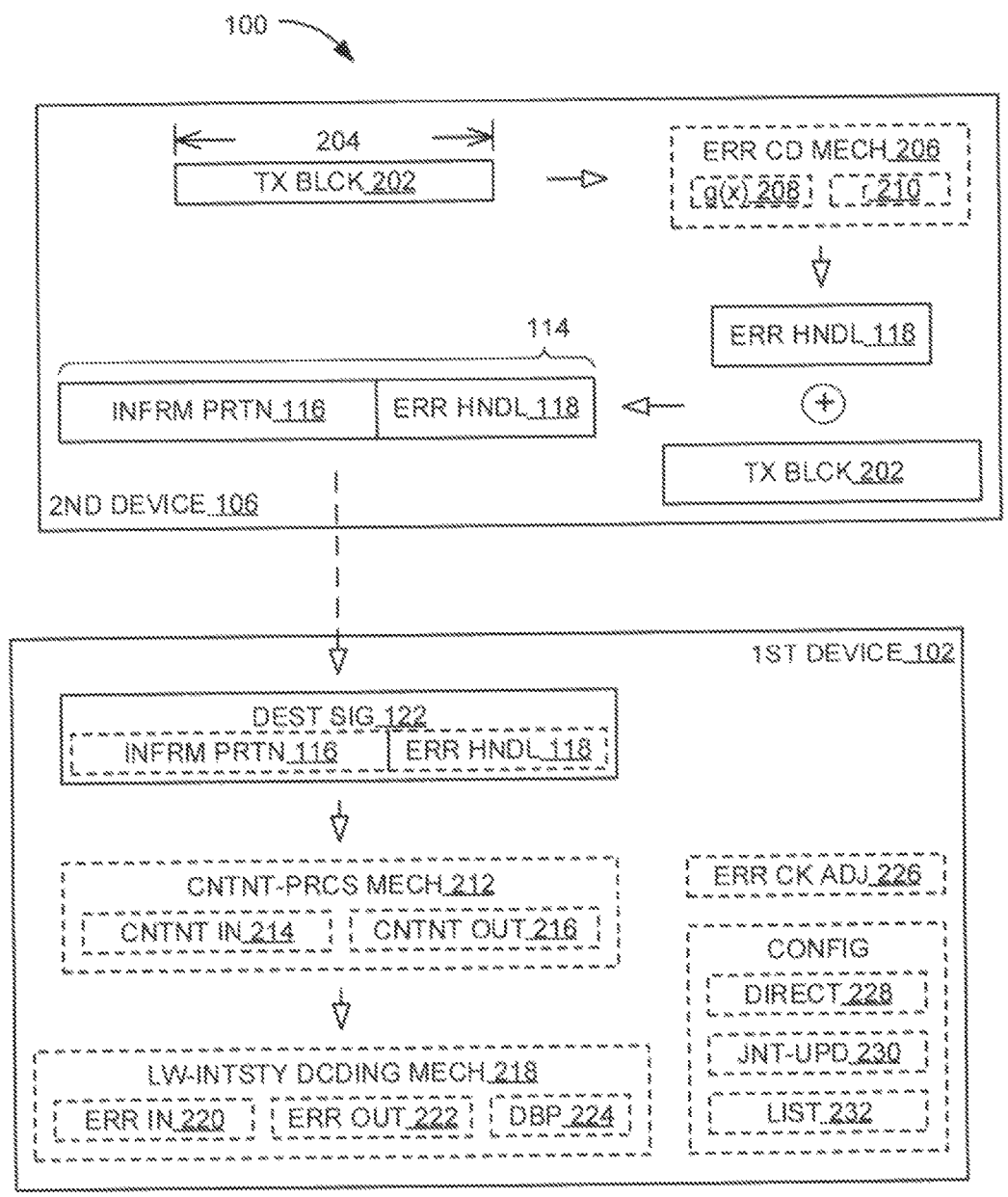
FIG. 2 is a detailed example of the computing system processing the content of FIG. 1.

Referring now to FIG. 2, a detailed example of the computing system 100 processing the content 108 of FIG. 1. The computing system 100 can process the source signal 114 including a transport block 202. The transport block 202 can include the content 108 or a portion thereof. The transport block 202 can be the content 108 in its entirety or a segment within the content 108 for communication or processing.

The transport block 202 can include a block length 204. The block length 204 can include a quantity or a size for the information in the transport block 202. The block length 204 can include a number of bits or bytes in the transport block 202.

The source signal 114 can include the error-handling portion 118 based on an error code mechanism 206. The error code mechanism 206 can include a method or a process for generating the error-handling portion 118. The error code mechanism 206 can include the method or the process for generating the error-handling portion 118 based on the transport block 202.

For example, the error code mechanism 206 can include generator polynomials 208 based on a polynomial order 210. The generator polynomials 208 can include polynomial values or parameters specifically designated for the error check process 126 of FIG. 1. The generator polynomials 208 can be divisors for polynomials of intended or sought information for validating the intended or sought information. The polynomial order 210 can include a magnitude or a size associated with the generator polynomials 208.

As a more specific example, the error code mechanism 206 can include CRC-24A or CRC-24B for the cyclic-redundancy-check mechanism 120 of FIG. 1. The generator polynomials 208 for the CRC-24A and CRC-24B can be expressed as:

$$gCRC24A(x)=[x^{24}+x^{23}+x^{18}+x^{17}+x^{14}+x^{11}+x^{10}+x^7+x^6+x^5+x^4+x^3+x+1].$$ Equation (1).

$$gCRC24B(x)=[x^{24}+x^{23}+x^6+x^5+x+1].$$ Equation (2).

Continuing with the example, the computing system 100 can apply the error code mechanism 206 based on the block length 204. The computing system 100 can segment the content 108 into multiple instances of the information portion 116 of FIG. 1 when the block length 204 of the initial instance of the transport block 202 is greater than a threshold, such as 6144. The computing system 100 can apply different instance of the error code mechanism 206 based on the block length 204, such as CRC-24A when the block length 204 is less than 6144 or CRC-24-B for each of the instances of the transport block 202 resulting from dividing the initial instance of the transport block 202 including the block length 204 exceeding 6144.

Continuing with the example, the computing system 100 can apply the error code mechanism 206, the generator polynomials 208, or a combination thereof to the transport block 202 to generate the error-handling portion 118. The computing system 100 can generate the error-handling portion 118 as redundant bits attached to the transport block 202, such as 16 or 24 bits of redundancy through systematic encoding.

The computing system 100 can process the content 108 by generating the source signal 114 with the transport block 202 or a divided instance thereof as the information portion 116. The computing system 100 can append the error-handling portion 118 to the transport block 202 to generate the source signal 114. The computing system 100 can generate the source signal 114, the error-handling portion 118, or a combination thereof using the second device 106, the first device 102, or a combination thereof.

For example, the base station or the transmitter encoding the communication information can generate the source signal 114, the error-handling portion 118, or a combination thereof for communication. Also for example, a storage-focused device or a memory management device can generate the source signal 114, the error-handling portion 118, or a combination thereof for storing information, for recalling or accessing stored information, or a combination thereof.

The computing system 100 can further process the content 108 by generating the parity-check parameter 130 of FIG. 1. The computing system 100 can generate the parity-check parameter 130 based on the error code mechanism 206, the generator polynomials 208, the polynomial order 210, or a combination thereof. The computing system 100 can generate the parity-check parameter 130 using the first device 102, the second device 106, or a combination thereof.

For example, the computing system 100 further process the content 108 with the parity-check parameter 130 at a receiving device, such as UE or a base station for uplinks. Also for example, the computing system 100 can further process the content 108 with the parity-check parameter 130 for a device processing outputs of the storage-focused device or the memory management device.

The computing system 100 can include a content-processing mechanism 212. The content-processing mechanism 212 can include a method or a process for estimating or recovering the content 108 using the information portion 116 of the source signal 114, the destination signal 122, a portion therein corresponding to the information portion 116, or a combination thereof.

The content-processing mechanism 212 can detect, decode, or a combination thereof for the destination signal 122. The content-processing mechanism 212 can estimate or recover the content 108 from the destination signal 122. The content-processing mechanism 212 can be iterative, jointly detect and decode, interference-aware, or a combination thereof. The content-processing mechanism 212 can include the error check process 126 of FIG. 1, the error correction process 128 of FIG. 1, or a combination thereof for the information portion 116.

The content-processing mechanism 212 can use the error-handling portion 118 for the error check process 126 and not for the error correction process 128. The content-processing mechanism 212 can be based on the formatting mechanism 110 of FIG. 1, such as the turbo processing mechanism 112 of FIG. 1. The computing system 100 can include the content-processing mechanism 212 in addition to, separate from, coupled with, or a combination thereof relative to the joint processing mechanism 124 of FIG. 1.

The computing system 100 can include a content-processing input 214, a content-processing output 216, or a combination thereof. The content-processing input 214 can include information given or provided for the content-processing mechanism 212 for generating an output. The content-processing input 214 can include an a-priori value, received or accessed signal, an initialized value, an output from a previous iteration or information block, an input for detection or decoding, an output from detection, or a combination thereof.

The content-processing output 216 can include information generated as a result from the content-processing mechanism 212. The content-processing output 216 can include a-posteriori value, an extrinsic value, a detection output, a decoding output, or a combination thereof. The content-processing output 216, the content-processing input 214, or a combination thereof can correspond to the information portion 116 with the error-handling portion 118 corresponding to the error check process 126 and not the error correction process 128.

The computing system 100 can further include a low-intensity decoding mechanism 218 for processing for the content 108. The low-intensity decoding mechanism 218 is a method or a process for decoding information according to the formatting mechanism 110 with a limitation or a control over decoding characteristic. The low-intensity decoding mechanism 218 can include the process or the method with limitation or reduction in aggressiveness in decoding the signal. The low-intensity decoding mechanism 218 can include reduced effect in decoding the signal.

The low-intensity decoding mechanism 218 can include a soft-input soft-output decoder utilizing soft-decisions, likelihood values, such as logarithmic-likelihood ratio (LLR), or a combination thereof. The joint processing mechanism 124 can include the low-intensity decoding mechanism 218. The computing system 100 can utilize the joint processing mechanism 124, the low-intensity decoding mechanism 218, or a combination thereof to decode for the content 108 using the error-handling portion 118, implementing the error correction process 128 with the error-handling portion 118, or a combination thereof.

The computing system 100 can include an error-decoding input 220, an error-decoding output 222, or a combination thereof. The error-decoding input 220 is information given or provided for decoding with the error-handling portion 118. The error-decoding input 220 can include the information given or provided to the low-intensity decoding mechanism 218, the joint processing mechanism 124, or a combination thereof.

The error-decoding input 220 can be similar to the content-processing input 214 but relative to decoding with the error-handling portion 118. The error-decoding input 220 can include an a-priori value, received or accessed signal, an initialized value, an output from a previous iteration or information block, an input for detection or decoding, an output from detection, or a combination thereof. The error-decoding input 220 can include the content-processing input 214, the content-processing output 216, or a combination thereof.

The error-decoding output 222 is a result of decoding with the error-handling portion 118. The error-decoding output 222 can include estimation of the content 108 based on decoding using the error-handling portion 118. The error-decoding output 222 can be similar to the content-processing output 216 but relative to decoding with the error-handling portion 118. The error-decoding output 222 can include a-posteriori value, an extrinsic value, a detection output, a decoding output, or a combination thereof. The computing system 100 can use the error-decoding output 222 as the content-processing input 214, the content-processing output 216, or a combination thereof.

As a specific example, the low-intensity decoding mechanism 218 can include a damped-belief propagation (DBP) mechanism 224. The damped-belief propagation mechanism 224 can include reducing an effect or a calculation result associated with check nodes. The damped-belief propagation mechanism 224 can include reduction or a control in adjusting the error-decoding input 220.

The computing system 100 can include an error check adjustment 226. The error check adjustment 226 is limitation of the error check process 126 for verifying estimation of the content 108 with the error-handling portion 118. The error check adjustment 226 can include an absence or a bypass, a reduction in execution or implementation, or a combination thereof for the error check process 126 in the joint processing mechanism 124.

The computing system 100 can include the joint processing mechanism 124 with various configurations associated with the content-processing mechanism 212 and the joint processing mechanism 124. For example, the joint processing mechanism 124 can include a direct processing mechanism 228, a joint-update mechanism 230, a list mechanism 232, or a combination thereof.

The direct processing mechanism 228 is a process, a method, or an arrangement for implementing the content-processing mechanism 212 and the joint processing mechanism 124 separately and sequentially. The direct processing mechanism 228 can implement the content-processing mechanism 212 before the joint processing mechanism 124. The direct processing mechanism 228 can implement the joint processing mechanism 124 when the content-processing mechanism 212 ends or reaches an end condition for the iterations without successfully decoding the content 108.

The joint-update mechanism 230 is a method, or an arrangement for combining the joint processing mechanism 124 within the content-processing mechanism 212. The joint-update mechanism 230 can use an output from one as an input to another, such as with the content-processing input 214, the content-processing output 216, the error-decoding input 220, the error-decoding output 222, or a combination thereof.

The list mechanism 232 is a method, or an arrangement for storing information for the joint processing mechanism 124 in combining the joint processing mechanism 124 within the content-processing mechanism 212. The list mechanism 232 can process the stored information after completing the content-processing mechanism 212.

The computing system 100 can include the error check adjustment 226 in the various configurations, such as the list mechanism 232, the joint-update mechanism 230, the direct processing mechanism 228, or a combination thereof. Details regarding the content-processing mechanism 212, the low-intensity decoding mechanism 218, the error check adjustment 226 and the various configurations are described below.

The various mechanisms and adjustments described above can be implemented in hardware, software, firmware, or a combination thereof. For example, the formatting mechanism 110, the joint processing mechanism 124, the error code mechanism 206, the content-processing mechanism 212, the low-intensity decoding mechanism 218, the error check adjustment 226 or a combination thereof can include an encoder, a decoder, a detector, a portion thereof, an implementation therein, or a combination thereof.

Also for example, the various mechanisms and adjustments can include specialized circuitry, such as passive components, active components, gates, field arrays, hardware logic, specific sequence or arrangement, connections, or a combination thereof. Also for example, the various mechanism and adjustments can include hardware accelerators, programmed circuitry, pre-loaded program, or a combination thereof. Also for example, the various mechanism and adjustments can include functions, executable instructions, libraries, drivers, or a combination thereof.

Figure 3:
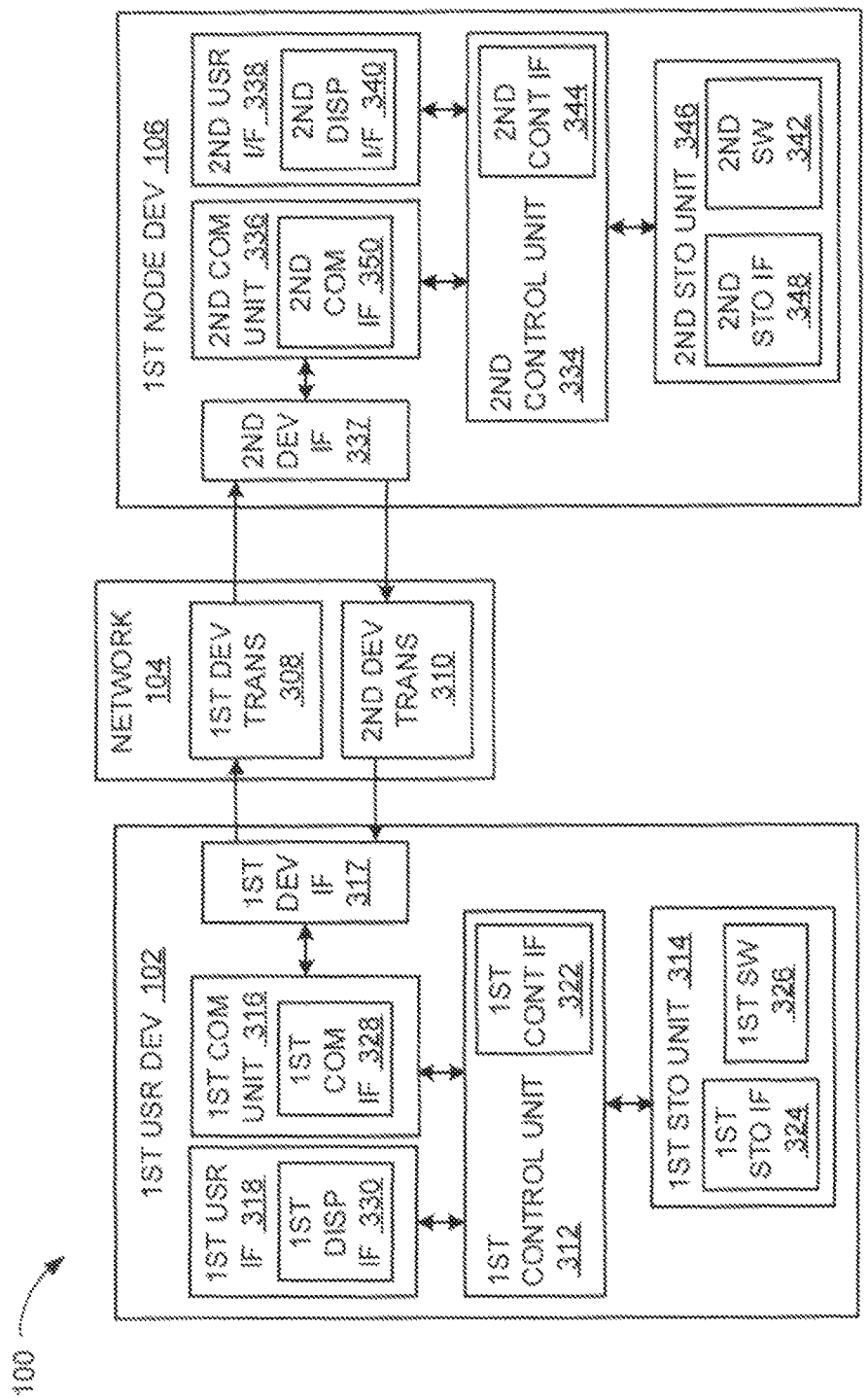
FIG. 3 is an exemplary block diagram of the computing system.

Referring now to FIG. 3, therein is shown an exemplary block diagram of the computing system 100. The computing system 100 can include the first device 102, the network 104, and the second device 106. The first device 102 can send information in a first device transmission 308 over the network 104 to the second device 106. The second device 106 can send information in a second device transmission 310 over the network 104 to the first device 102.

For illustrative purposes, the computing system 100 is shown with the first device 102 as a client device, although it is understood that the computing system 100 can have the first device 102 as a different type of device. For example, the first device 102 can be a server having a display interface.

Also for illustrative purposes, the computing system 100 is shown with the second device 106 as a server, although it is understood that the computing system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 312, a first storage unit 314, a first communication unit 316, and a first user interface 318. The first control unit 312 can include a first control interface 322. The first control unit 312 can execute a first software 326 to provide the intelligence of the computing system 100.

The first control unit 312 can be implemented in a number of different manners. For example, the first control unit 312 can be a processor, an application specific integrated circuit (ASIC) an embedded processor, a microprocessor, a hardware control logic, a hardware finite state machine (FSM), a digital signal processor (DSP), or a combination thereof. The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations external to the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The first storage unit 314 can store the first software 326. The first storage unit 314 can also store the relevant information, such as data representing incoming images, data representing previously presented image, sound files, or a combination thereof.

The first storage unit 314 can be a volatile memory, a nonvolatile memory, an internal memory, an external memory, or a combination thereof. For example, the first storage unit 314 can be a nonvolatile storage such as non-volatile random access memory (NVRAM), Flash memory, disk storage, or a volatile storage such as static random access memory (SRAM).

The first storage unit 314 can include a first storage interface 324. The first storage interface 324 can be used for communication between the first storage unit 314 and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations external to the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106, a different device, an attachment, such as a peripheral device or a desktop computer, the network 104, or a combination thereof.

The first communication unit 316 can also function as a communication hub allowing the first device 102 to function as part of the network 104 and not limited to be an end point or terminal unit to the network 104. The first communication unit 316 can include active and passive components, such as microelectronics or an antenna, for interaction with the network 104.

The first communication unit 316 can include a baseband device or component, a modem, a digital signal processor, or a combination thereof for transmitting, formatting, receiving, detecting, decoding, further processing, or a combination thereof for communication signals. The first communication unit 316 can include one or more portions for processing the voltages, the currents, the digital information, or a combination thereof, such as an analog-to-digital converter, a digital-to-analog converter, a filter, an amplifier, a processor-type circuitry, or a combination thereof. The first communication unit 316 can further include one or more portions for storing information, such as cache or RAM memory, registers, or a combination thereof.

The first communication unit 316 can be coupled with a first inter-device interface 317. The first inter-device interface 317 can be a device or a portion of a device for physically communicating signals with a separate device. The first inter-device interface 317 can communicate by transmitting or receiving signals to or from another device. The first inter-device interface 317 can include one or more antennas for wireless signals, a physical connection and receiver-transmitter for wired signals, or a combination thereof. The first inter-device interface 317 can include an omnidirectional antenna, a wire, an antenna chip, a ceramic antenna, or a combination thereof. The first inter-device interface 317 can further include a port, a wire, a repeater, a connector, a filter, a sensor, or a combination thereof.

The first inter-device interface 317 can detect or respond to a power in electromagnetic waves and provide the detected result to the first communication unit 316 to receive a signal, including the second device transmission 310. The first inter-device interface 317 can provide a path or respond to currents or voltages provided by the first communication unit 316 to transmit a signal, including the first device transmission 308.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, an infrared sensor for receiving remote signals, or any combination thereof to provide data and communication inputs.

The first user interface 318 can include a first display interface 330. The first display interface 330 can include an output device. The first display interface 330 can include a display, a projector, a video screen, a speaker, or any combination thereof.

The first control unit 312 can operate the first user interface 318 to display information generated by the computing system 100. The first control unit 312 can also execute the first software 326 for the other functions of the computing system 100. The first control unit 312 can further execute the first software 326 for interaction with the network 104 via the first communication unit 316.

The second device 106 can be optimized for implementing an embodiment of the present invention in a multiple device embodiment with the first device 102. The second device 106 can provide the additional or higher performance processing power compared to the first device 102. The second device 106 can include a second control unit 334, a second communication unit 336, a second user interface 338, and a second storage unit 346.

The second user interface 338 allows a user (not shown) to interface and interact with the second device 106. The second user interface 338 can include an input device and an output device. Examples of the input device of the second user interface 338 can include a keypad, a touchpad, soft-keys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control unit 334 can execute a second software 342 to provide the intelligence of the second device 106 of the computing system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the computing system 100, including operating the second communication unit 336 to communicate with the first device 102 over the network 104.

The second control unit 334 can be implemented in a number of different manners. For example, the second control unit 334 can be a processor, an embedded processor, a microprocessor, hardware control logic, a hardware finite state machine (FSM), a digital signal processor (DSP), or a combination thereof.

The second control unit 334 can include a second control interface 344. The second control interface 344 can be used for communication between the second control unit 334 and other functional units in the second device 106. The second control interface 344 can also be used for communication that is external to the second device 106.

The second control interface 344 can receive information from the other functional units or from external sources, or can transmit information to the other functional units or to external destinations. The external sources and the external destinations refer to sources and destinations external to the second device 106.

The second control interface 344 can be implemented in different ways and can include different implementations depending on which functional units or external units are being interfaced with the second control interface 344. For example, the second control interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the information such as data representing incoming images, data representing previously presented image, sound files, or a combination thereof. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the computing system 100 is shown with the second storage unit 346 as a single hierarchy storage system, although it is understood that the computing system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as non-volatile random access memory (NVRAM), Flash memory, disk storage, or a volatile storage such as static random access memory (SRAM).

The second storage unit 346 can include a second storage interface 348. The second storage interface 348 can be used for communication between the second storage unit 346 and other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations external to the second device 106.

The second storage interface 348 can include different implementations depending on which functional units or external units are being interfaced with the second storage unit 346. The second storage interface 348 can be implemented with technologies and techniques similar to the implementation of the second control interface 344.

The second communication unit 336 can enable external communication to and from the second device 106. For example, the second communication unit 336 can permit the second device 106 to communicate with the first device 102 over the network 104.

The second communication unit 336 can also function as a communication hub allowing the second device 106 to function as part of the network 104 and not limited to be an end point or terminal unit to the network 104. The second communication unit 336 can include active and passive components, such as microelectronics or resistors, for interaction with the network 104.

The second communication unit 336 can include a baseband device or component, a modem, a digital signal processor, or a combination thereof for transmitting, formatting, receiving, detecting, decoding, further processing, or a combination thereof for communication signals. The second communication unit 336 can include one or more portions for processing the voltages, the currents, the digital information, or a combination thereof, such as an analog-to-digital converter, a digital-to-analog converter, a filter, an amplifier, a processor-type circuitry, or a combination thereof. The second communication unit 336 can further include one or more portions for storing information, such as cache or RAM memory, registers, or a combination thereof.

The second communication unit 336 can be coupled with a second inter-device interface 337. The second inter-device interface 337 can be a device or a portion of a device for physically communicating signals with a separate device. The second inter-device interface 337 can communicate by transmitting or receiving signals to or from another device. The second inter-device interface 337 can include one or more antennas for wireless signals, a physical connection and receiver-transmitter for wired signals, or a combination thereof. The second inter-device interface 337 can include an omnidirectional antenna, a wire, an antenna chip, a ceramic antenna, or a combination thereof. The second inter-device interface 337 can further include a port, a wire, a repeater, a connector, a filter, a sensor, or a combination thereof.

The second inter-device interface 337 can detect or respond to a power in electromagnetic waves and provide the detected result to the second communication unit 336 to receive a signal, including the first device transmission 308. The second inter-device interface 337 can provide a path or respond to currents or voltages provided by the second communication unit 336 to transmit a signal, including the second device transmission 310.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second control interface 344.

The first communication unit 316 can couple with the network 104 to send information to the second device 106 in the first device transmission 308. The second device 106 can receive information in the second communication unit 336 from the first device transmission 308 of the network 104.

The second communication unit 336 can couple with the network 104 to send information to the first device 102 in the second device transmission 310. The first device 102 can receive information in the first communication unit 316 from the second device transmission 310 of the network 104. The computing system 100 can be executed by the first control unit 312, the second control unit 334, or a combination thereof. For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. Also, the second device 106 can include other functional units not shown in FIG. 3 for clarity.

The functional units in the first device 102 can work individually and independently of the other functional units. The first device 102 can work individually and independently from the second device 106 and the network 104.

The functional units in the second device 106 can work individually and independently of the other functional units. The second device 106 can work individually and independently from the first device 102 and the network 104.

The functional units described above can be implemented in hardware. For example, one or more of the functional units can be implemented using the a gate, circuitry, a processor, a computer, integrated circuit, integrated circuit cores, a pressure sensor, an inertial sensor, a microelectromechanical system (MEMS), a passive device, a physical non-transitory memory medium having instructions for performing the software function, a portion therein, or a combination thereof.

For illustrative purposes, the computing system 100 is described by operation of the first device 102 and the second device 106. It is understood that the first device 102 and the second device 106 can operate any of the modules and functions of the computing system 100.

Figure 4:
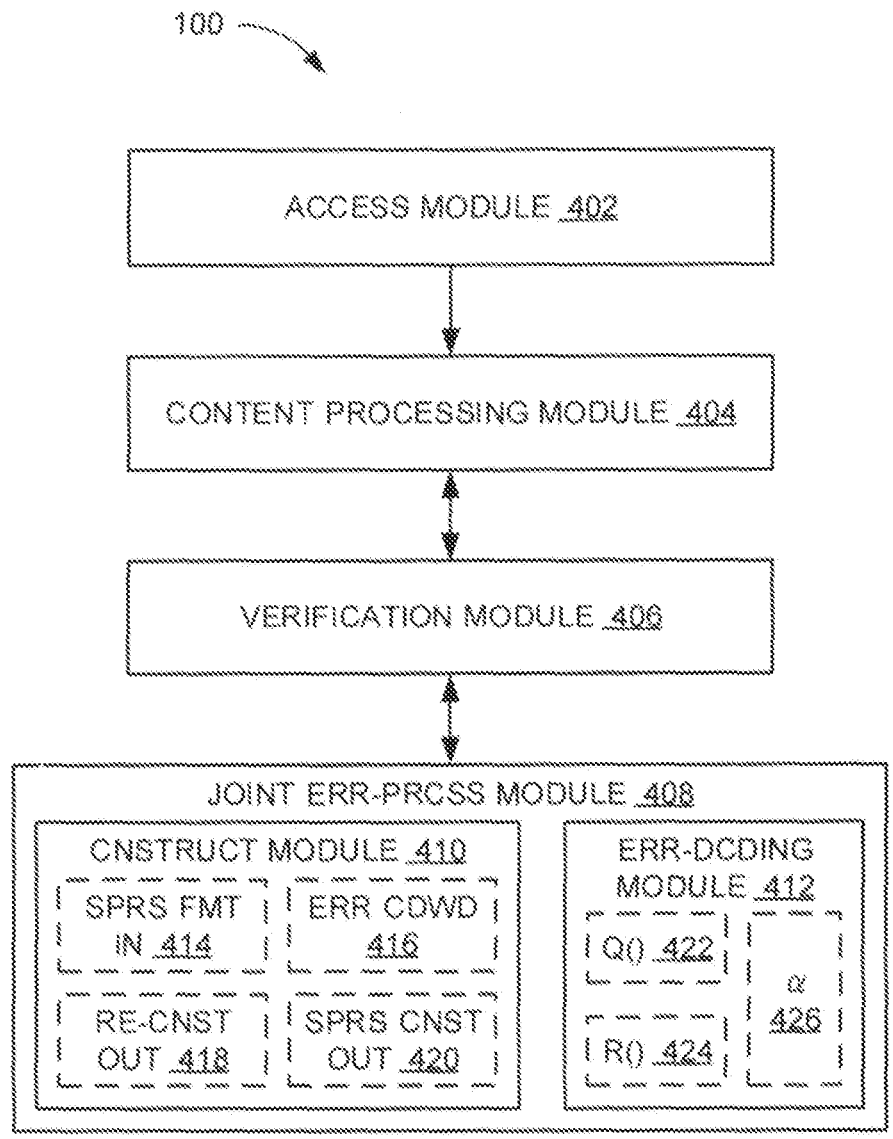
FIG. 4 is a control flow of the computing system.

Referring now to FIG. 4, therein is shown a control flow of the computing system 100. The computing system 100 can include an access module 402, a content processing module 404, a verification module 406, a joint error-processing module 408, or a combination thereof.

The access module 402 can be coupled with the content processing module 404, which can be further coupled with the verification module 406. The verification module 406 can be coupled with the joint error-processing module 408.

The modules can be coupled to each other in a variety of ways. For example, modules can be coupled by having the input of one module connected to the output of another, such as by using wired or wireless connections, the network 110 of FIG. 1, instructional steps, process sequence, or a combination thereof. Also for example, the modules can be coupled either directly with no intervening structure other than connection means between the directly coupled modules, or indirectly with modules or devices other than the connection means between the indirectly coupled modules.

As a more specific example, one or more inputs or outputs of the access module 402 can be connected to one or more inputs or outputs of the content processing module 404 using conductors or the transmission channel without intervening modules or devices there-between. Also for example, the access module 402 can be coupled to the content processing module 404 indirectly using a wireless channel with a repeater, a switch, a routing device, or a combination thereof. The content processing module 404, the verification module 406, the joint error-processing module 408, or a combination thereof can be coupled in similar ways.

The computing system 100 can communicate information between devices, such as by sending, transmitting, receiving, coding, decoding, or a combination thereof. The receiving device can further communicate with the user by displaying images, recreating sounds, exchanging process steps or instructions, or a combination thereof according to the information communicate to the device.

The access module 402 is configured to access information intended for the content 108 of FIG. 1. The access module 402 can access the destination signal 122 of FIG. 1, the source signal 114 of FIG. 1, or a combination thereof. The access module 402 can include the destination signal 122, the source signal 114, or a combination thereof including the information portion 116 of FIG. 1 for representing the content 108 and the error-handling portion 118 of FIG. 1 for describing the information portion 116 relative to the content 108.

The access module 402 can access the information using the first inter-device interface 317 of FIG. 3, the second inter-device interface 337 of FIG. 3, the first communication interface 328 of FIG. 3, the second communication interface 350 of FIG. 3, the first control interface 322 of FIG. 3, the second control interface 344 of FIG. 3, the first storage interface 324 of FIG. 3, the second storage interface 348 of FIG. 3, or a combination thereof. For example, the access module 402 can access the information by communicating, such as transmitting or receiving, the source signal 114, the destination signal 122, or a combination thereof using the first inter-device interface 317, the second inter-device interface 337, the first communication interface 328, the second communication interface 350, or a combination thereof.

Also for example, the access module 402 can store or access stored information, such as the source signal 114, the destination signal 122, or a combination thereof, using the first communication unit 316 of FIG. 3, the second communication unit 336 of FIG. 3, the first storage unit 314 of FIG. 3, the second storage unit 346 of FIG. 3, or a combination thereof. The access module 402 can access stored information using the first communication interface 328, the second communication interface 350, the first control interface 322, the second control interface 344, the first storage interface 324, the second storage interface 348, or a combination thereof.

After accessing the information, the control flow can pass to the content processing module 404. The control flow can pass through a variety of ways. For example, control flow can pass by having processing results of one module passed to another module, such as by passing the destination signal 122 from the access module 402 to the content processing module 404, by storing the processing results at a location known and accessible to the other module, such as by storing the destination signal 122 at a storage location known and accessible to the content processing module 404, by notifying the other module, such as by using a flag, an interrupt, a status signal, or a combination for the content processing module 404, or a combination of processes thereof.

The content processing module 404 is configured to process for the content 108. The content processing module 404 can estimate the content 108 from the destination signal 122. The content processing module 404 can estimate the content 108 using the content-processing mechanism 212 of FIG. 2 with the information portion 116. The content processing module 404 can process for the content 108 by implementing the error correction process 128 of FIG. 1 with the information portion 116.

For example, the content processing module 404 can detect, decode, or a combination thereof with the information portion 116. The content processing module 404 can use the content-processing mechanism 212 for estimating the content 108 using the information portion 116. The content processing module 404 can use the error-handling portion 118 for the error check process 126 of FIG. 1 and not for the error correction process 128. The content processing module 404 can use the information portion 116 for the error correction process 128 without using the error-handling portion 118.

The content processing module 404 can process for the content 108 based on the content-processing mechanism 212 associated with the formatting mechanism 110 of FIG. 1, such as the turbo processing mechanism 112 of FIG. 1. The content processing module 404 can process for the content 108 using iterative processing, such as with feedbacks or loops. The content processing module 404 can include a maximum limitation or threshold on the processing, such as for the iterations or exit conditions.

The content processing module 404 can estimate the content 108 using soft information or decision. The content processing module 404 can calculate LLR values for estimating the content 108. The content processing module 404 can use the content-processing input 214 of FIG. 2, the content-processing output 216 of FIG. 2, or a combination thereof. The content processing module 404 can use the content-processing input 214, the content-processing output 216, or a combination thereof including the LLR value.

The content processing module 404 can use initialized value, previous processing output, a-priori value, the destination signal 122, detection result, decoding result, or a combination thereof. The content processing module 404 can calculate or generate the content-processing output 216 as a-posteriori value, extrinsic value, or a combination thereof.

The content processing module 404 can use the first communication unit 316, the second communication unit 336, the first control unit 312 of FIG. 3, the second control unit 334 of FIG. 3, or a combination thereof to estimate the content 108. The content processing module 404 can store the content-processing input 214, the content-processing output 216, or a combination thereof in the first storage unit 314, the second storage unit 346, the first communication unit 316, the second communication unit 336, or a combination thereof.

After processing for the content 108 with the information portion 116, the control flow can be passed from the content processing module 404 to the verification module 406. The control flow can pass similarly as described above between the access module 402 and the content processing module 404 but using processing results of the content processing module 404, such as the content-processing output 216.

The verification module 406 is configured to check accuracy of the decoding result. The verification module 406 can use the content-processing mechanism 212 to implement the error check process 126. The verification module 406 can use the error-handling portion 118 to verify the accuracy of the content-processing output 216.

For example, the verification module 406 can identify the content-processing output 216 corresponding to the systematic information bits associated with the information portion 116. The verification module 406 can re-encode for the information portion 116 based on the content-processing output 216. The verification module 406 can compare the re-encoded instance of the redundancy bits corresponding to the error-handling portion 118 to the existing instance of the error-handling portion 118.

The verification module 406 can determine the decoding process associated with the error correction process 128, or the content-processing output 216 associated thereto, as success or passing when the re-encoded instance and the existing instance of the error-handling portion 118 match. The verification module 406 can determine the decoding process associated with the error correction process 128, or the content-processing output 216 associated thereto, as failing when the re-encoded instance and the existing instance of the error-handling portion 118 do not match.

The verification module 406 can verify the content-processing output 216 of the error correction process 128 after each iteration of the error correction process 128 implemented by the content processing module 404. The verification module 406 can verify the content-processing output 216 until the error correction process 128 finishes, reaches final iteration, or limiting condition without passing the error check process 126.

The verification module 406 use the first communication unit 316, the second communication unit 336, the first control unit 312, the second control unit 334, or a combination thereof to verify the content-processing output 216 and implement the error check process 126. The verification module 406 can store the outcome of the error check process 126 or the verified or processed instance of the content-processing output 216 in the first storage unit 314, the second storage unit 346, the first communication unit 316, the second communication unit 336, or a combination thereof.

After implementing the error check process 126, the control flow can be passed from the verification module 406 to the content processing module 404 or the joint error-processing module 408. The control flow can pass based on failing or unsuccessful outcome of the error check process 126. The computing system 100 can generate the estimate for the content 108 when the outcome of the error check process 126 is successful or pass. The control flow can pass similarly as described above between the access module 402 and the content processing module 404 but using processing results of the content processing module 404, such as the outcome of the error check process 126 or the verified or processed instance of the content-processing output 216.

The joint error-processing module 408 is configured to decode for the content 108 using the error-handling portion 118. The joint error-processing module 408 can use both the error-handling portion 118 and the information portion 116 to decode for the content 108. The joint error-processing module 408 can implement the error correction process 128 utilizing the error-handling portion 118 with the joint processing mechanism 124 of FIG. 1.

The joint error-processing module 408 can use the content-processing input 214, the content-processing output 216, or a combination thereof for the error correction process 128 utilizing the error-handling portion 118. The joint error-processing module 408 can include a construction module 410, an error-decoding module 412, or a combination thereof for decoding the information portion 116 using the error-handling portion 118.

The construction module 410 is configured to generate the parity-check parameter 130 of FIG. 1 for implementing the error correction process 128 utilizing the error-handling portion 118. The construction module 410 can generate the parity-check parameter 130 from the destination signal 122 based on the sparse configuration 132 of FIG. 1.

The construction module 410 can generate the parity-check parameter 130 by generating a sparse-format input 414 including the sparse configuration 132 based on the information portion 116 of the destination signal 122, the content-processing output 216 derived from decoding the destination signal 122, or a combination thereof. The sparse-format input 414 can include the information portion 116 rearranged according to the sparse configuration 132.

For example, the construction module 410 can generate the sparse-format input 414 as an identity matrix, represented as '$I_B = [i_1; i_2; \ldots; i_B]$'. The term 'B' can represent the block length 204 of FIG. 2 for the information portion 116 of the destination signal 122. Each instance of '$i_j$' can include a size or length equal to the block length 204, and further include a single '1' at coordinate position 'j' and zeroes at the remaining coordinates.

The construction module 410 can generate the parity-check parameter 130 based on the sparse-format input 414. The construction module 410 can generate the parity-check parameter 130 based on generating an error-portion code-word 416 from the sparse-format input 414. The error-portion code-word 416 can include a result of re-encoding a segment within the information portion 116.

The error-portion code-word 416 can include the result of re-encoding with the error code mechanism 206 of FIG. 2. The construction module 410 can generate the error-portion code-word 416 by appending corresponding portions, re-generated instance, or a combination thereof for the error-handling portion 118 associated with the sparse-format input 414 or a portion therein. The error-portion code-word 416 can be based on the generator polynomials 208 of FIG. 2 associated with generating the error-handling portion 118.

Continuing with the example, the construction module 410 can generate the error-portion code-word 416 according to the cyclic-redundancy-check mechanism 120 of FIG. 1 by encoding the jth row into the error-portion code-word 416. The construction module 410 can use the generator polynomials 208 with the polynomial order 210 of FIG. 2 to calculate a re-constitution output 418. The re-constitution output 418, represented as '$\rho_j$', is a portion of the error-handling portion 118, such as a small number of CRC bits, corresponding to the sparse-format input 414 or a portion therein, as resulting from re-encoding process.

Continuing with the example, the construction module 410 can generate the re-constitution output 418 based on a polynomial division using the generator polynomials 208 known to the computing system 100 and the devices therein. The construction module 410 can generate the re-constitution output 418 according to:

$$\rho_j(x) = rem\{x^r i_j(x), g(x)\}. \quad \text{Equation (3).}$$

Continuing with the example, the re-constitution output 418 can be represented as '$\rho_j(x)$', the generator polynomials 208 can be represented as '$g(x)$', and the polynomial order 210 can be represented as 'r'. The term 'rem' can represent a remainder function. The term '$i_j(x)$' can represent the sparse-format input 414 or a portion therein.

Continuing with the example, the construction module 410 can generate the error-portion code-word 416 by combining the sparse-format input 414 and the re-constitution output 418. The construction module 410 can combine or append a portion of the sparse-format input 414 with a corresponding portion of the re-constitution output 418 for a specific instance or portion of the error-portion code-word 416. The construction module 410 can generate the error-portion code-word 416 according to:

$$c_j = [\rho_j, i_j]. \quad \text{Equation (4).}$$

The error-portion code-word 416 can be represented with '$c_j$'.

The construction module 410 can generate the parity-check parameter 130 including the sparse configuration 132 based on the error-portion code-word 416, the sparse-format input 414, or a combination thereof. The construction module 410 can generate a sparse constitution output 420 by rearranging or re-formatting the error-portion code-word 416, the re-constitution output 418 therein, or a combination thereof for or according to the sparse configuration 132.

Continuing with the above example, the construction module 410 can generate the sparse constitution output 420 as a matrix including corresponding instance or portion of the error-portion code-word 416 or the re-constitution output 418 therein at a specific location. As a more specific example, the construction module 410 can generate the sparse constitution output 420 as a matrix including whose $j^{th}$ row is $\rho_j$. The sparse constitution output 420 can be represented as 'R'.

The construction module 410 can generate the parity-check parameter 130 based on the sparse constitution output 420 from the error-portion code-word 416 or the re-constitution output 418 therein. Continuing with the example, the construction module 410 can generate the parity-check parameter 130 as a matrix having a size or dimension based on the block length 204, the polynomial order 210, or a combination thereof.

As a more specific example, the construction module 410 can generate the parity-check parameter 130 as a matrix having the size or dimension of 'r×(B+r)', with 'r' representing the polynomial order 210 and 'B' representing the block length 204. The construction module 410 can generate the parity-check parameter 130 according to:

$$H_B = [I_r, R^T].$$  Equation (5).

Continuing with the example, the parity-check parameter 130 can be represented with '$H_B$'. The construction module 410 can use an identity matrix sized based on the polynomial order 210, represented as '$I_r$' having a size or dimension of 'r×r'. The construction module 410 can generate the parity-check parameter 130 based on combining or appending the identity matrix sized based on the polynomial order 210 with a transposed instance of the sparse constitution output 420.

The parity-check parameter 130 can include a sparse sub-matrix including the sparse configuration 132 in specific coordinates represented by 'r'. Continuing with the example, the specific coordinates can correspond to the CRC redundancy parity bits. The corresponding Tanner graph will have r single degree nodes at these redundancy coordinates.

It has been discovered that the parity-check parameter 130 including or based on the sparse configuration 132 provides low complexity processing and increasing coding gains without affecting the error detection capability. The parity-check parameter 130 including or based on the sparse configuration 132 can enable usage of the error-handling portion 118 in the error correction process 128 to provide meaningful results without decreasing the effectiveness of the error check process 126 further using the error-handling portion 118.

It has been discovered that the parity-check parameter 130 based on the coordinate-identity parameter provides increase in coding gains without affecting the error detection capability. The coordinate-identity parameter provides the sparse configuration 132 for the parity-check parameter 130.

It has been discovered that the parity-check parameter 130 based on the re-constitution output 418 and the sparse constitution output 420 provides increase in achievable throughput for the computing system 100. The parity-check parameter 130 based on the re-constitution output 418 and the sparse constitution output 420 enables the computing system 100 to reliably use the error-handling portion 118 to further enhance or optimize the error correction process 128 without decreasing the effectiveness of the error check process 126.

The construction module 410 can use the first communication unit 316, the second communication unit 336, the first control unit 312, the second control unit 334, or a combination thereof to generate the parity-check parameter 130 including or based on the sparse configuration 132. The construction module 410 can store the parity-check parameter 130 including or based on the sparse configuration 132 in the first storage unit 314, the second storage unit 346, the first communication unit 316, the second communication unit 336, or a combination thereof.

The error-decoding module 412 is configured to estimate the content 108 based on decoding the information portion 116 using the error-handling portion 118. The error-decoding module 412 can decode the information portion 116 using the parity-check parameter 130, the joint processing mechanism 124, or a combination thereof for decoding the information portion 116 with the error-handling portion 118.

The error-decoding module 412 can implement the error correction process 128 that utilizes the error-handling portion 118, the parity-check parameter 130, or a combination thereof based on the sparse configuration 132 with the joint processing mechanism 124. The error-decoding module 412 can further implement the error correction process 128 utilizing the error-handling portion 118 using the content-processing output 216 with the joint processing mechanism 124.

For example, the error-decoding module 412 can implement the joint processing mechanism 124 including the low-intensity decoding mechanism 218 of FIG. 2. The error-decoding module 412 can decode the information portion 116 using the low-intensity decoding mechanism 218 with the parity-check parameter 130 based on the sparse configuration 132. As a more specific example, the error-decoding module 412 can estimate the content 108 using the damped-belief propagation mechanism 224 of FIG. 2 for decoding the information portion 116 with the error-handling portion 118 and the parity-check parameter 130 based on the sparse configuration 132.

Continuing with the example, the error-decoding module 412 can use the low-intensity decoding mechanism 218 for implementing low complexity soft-in soft-out decoding for the cyclic-redundancy-check mechanism 120. The error-decoding module 412 can implement using the damped-belief propagation mechanism 224 with the parity-check parameter 130 including or based on the sparse configuration 132.

Continuing with the example, the error-decoding module 412 can calculate a check-node value 422 based on a variable-node value 424. The check-node value 422 can be represented as 'Q(i,j)' and the variable-node value 424 can be represented as 'R(i,j)' for all '(i,j)' such that 'H(i,j)=1'. The check-node value 422, the variable-node value 424, or a combination thereof can be calculated as LLR value. The check-node value 422 can include an extrinsic information available at a check node. The variable-node value 424 can include total information at a variable node.

Continuing with the example, the error-decoding module 412 can initialize the check-node value 422 based on the error-decoding input 220 of FIG. 2 according to the damped-belief propagation mechanism 224. As a more specific example, the error-decoding input 220 can initialize the check-node value 422 based on the error-decoding input 220 including the error-decoding output 222 of FIG. 2 for previous iteration, code word, signal or block, or a combination thereof, the content-processing output 216, or a combination thereof.

Continuing with the example, the error-decoding module 412 can initialize the check-node value 422 according to:

$$Q(i,j)=\Lambda^{in}(j). \qquad \text{Equation (6).}$$

The error-decoding input 220 can be represented as '$\Lambda^{in}(j)$'.

Continuing with the example, the error-decoding module 412 can further process the check-node value 422, the variable-node value 424, the error-decoding input 220, or a combination thereof to calculate the error-decoding output 222 based on decoding the information portion 116 with the error-handling portion 118. As a more specific example, the error-decoding module 412 can update the check-node value 422, the variable-node value 424, or a combination thereof based on the check-node value 422, the variable-node value 424, the error-decoding input 220, or a combination thereof. Also as a more specific example, the error-decoding module 412 can control or reduce contributions from processing results in updating other results.

Continuing with the example, the error-decoding module 412 can further process to calculate the error-decoding output 222 according to:

$$R(i,j) = \log\left(\frac{1 + \prod_{k \in J(i)\backslash j} \tanh\left(\frac{Q(i,k)}{2}\right)}{1 - \prod_{k \in J(i)\backslash j} \tanh\left(\frac{Q(i,k)}{2}\right)}\right) \qquad \text{Equation (7).}$$

$$= 2\tanh^{-1}\left(\prod_{k \in J(i)\backslash j} \tanh\left(\frac{Q(i,k)}{2}\right)\right).$$

$$Q(i,j) = \Lambda^{in}(j) + \alpha \sum_{k \in I(j)\backslash i} R(k,j). \qquad \text{Equation (8).}$$

For Equation (8), the check-node value 422 can be updated based on updating the error-decoding input 220 representing extrinsic information of a particular bit corresponding to an index 'j' with one or more instances of the variable-node value 424 corresponding to index other than 'j'.

The check-node value 422 can be further updated based on a dampening factor 426, represented as 'α', for reducing the effect of the adjustment to provide a limitation or a control over decoding characteristic. The dampening factor 426 can include a value between 0 and 1, such as for '0<α<1'.

Continuing with the example, the error-decoding module 412 can update the various values as described in Equations (7)-(8) until a stopping criterion is satisfied. The stopping criterion can include a condition or a situation concerning the decoding process, such as based on thresholds for the processing results. The stopping criterion can further be based on a maximum limitation for number of iterations.

Continuing with the example, the error-decoding module 412 can calculate the error-decoding output 222 based on the updated instances of the check-node value 422, the variable-node value 424, the error-decoding input 220, or a combination thereof according to the damped-belief propagation mechanism 224. The error-decoding module 412 can calculate the error-decoding output 222 according to:

$$\Lambda^x(j)=\Sigma_{k \in I(j)}R(k,j). \qquad \text{Equation (9).}$$

The error-decoding output 222 can be represented as '$\Lambda^x(j)$'. The error-decoding module 412 can calculate the error-decoding output 222 as extrinsic output LLRs after CRC decoding process, such as the error correction process 128 using the error-handling portion 118 with the joint processing mechanism 124.

It has been discovered that the low-intensity decoding mechanism 218 decoding using the parity-check parameter 130 including or based on the sparse configuration 132 provides low complexity processing increasing coding gains without affecting the error detection capability. The combination of the low-intensity decoding mechanism 218 and the parity-check parameter 130 including or based on the sparse configuration 132 provides meaningful output from using the error-handling portion 118 in implementing the error correction process 128.

The error-decoding output 222 can use the first communication unit 316, the second communication unit 336, the first control unit 312, the second control unit 334, or a combination thereof to decode and calculate the error-decoding output 222. The error-decoding output 222 can store decoding results including the error-decoding output 222, the check-node value 422, the variable-node value 424, the error-decoding input 220, or a combination thereof in the first storage unit 314, the second storage unit 346, the first communication unit 316, the second communication unit 336, or a combination thereof.

After decoding the information portion 116 for implementing the error correction process 128 using the error-handling portion 118, the control flow can pass to the verification module 406, the content processing module 404, or a combination thereof. The control flow can pass according to the configuration, such as the direct processing mechanism 228 of FIG. 2, the joint-update mechanism 230 of FIG. 2, the list mechanism 232 of FIG. 2. The control flow can further pass based on the error check adjustment 226 of FIG. 2.

The computing system 100 can estimate the content 108 using the error-handling portion 118 based on the direct processing mechanism 228, the joint-update mechanism 230, or the list mechanism 232. The control flow, the error check adjustment 226, sequence for operations described above, or a combination thereof can be based on or according to the direct processing mechanism 228, the joint-update mechanism 230, or the list mechanism 232.

For example, the control flow can be passed to the verification module 406 after the joint error-processing module 408 for the direct processing mechanism 228, the list mechanism 232, or a combination thereof. The computing system 100 can use the error-decoding module 412 to estimate the content 108 with the joint processing mechanism 124 being implemented after the content-processing mechanism 212 for decoding the information portion 116 with the error-handling portion 118. The error check adjustment 226 can include ending the control flow based on implementing the error check process 126 once after the joint processing mechanism 124 at the verification module 406, store or update memory information, or a combination thereof.

Also for example, the control flow can be passed for estimating the content 108 using the content-processing mechanism 212 integral with the joint processing mechanism 124, the content-processing mechanism 212 for iteratively estimating the content 108 from the information portion 116 and the joint processing mechanism 124 for separately and additionally decoding the information portion 116 with the error-handling portion 118. The computing system 100 can calculate the content-processing output 216 based on the error-decoding output 222 for estimating the content 108.

Also for example, the control flow can be passed for estimating the content 108 using the joint processing mechanism 124 including the error check process 126 based on the error check adjustment 226 for limiting the error check process 126 verifying estimation of the content 108 with the error-handling portion 118. Details regarding the configuration are described below.

For illustrative purposes, the computing system 100 is described in the context of using the turbo processing mechanism 112 of FIG. 1 and the damped-belief propagation mechanism 224. However, it is understood that the computing system 100 can implement the above described process differently. For example, the computing system 100 can implement any instance of the low-intensity decoding mechanism 218 characterized as less aggressive in decoding characteristics. Also for example, the computing system 100 can implement for other instance of the error correction process 128, such as polar coding mechanism.

Also for illustrative purposes, the computing system 100 is described in the context of utilizing the cyclic-redundancy-check mechanism 120. However, it is understood that the computing system 100 can implement the above described process differently, such as for low-density parity-check (LDPC).

Figure 5:
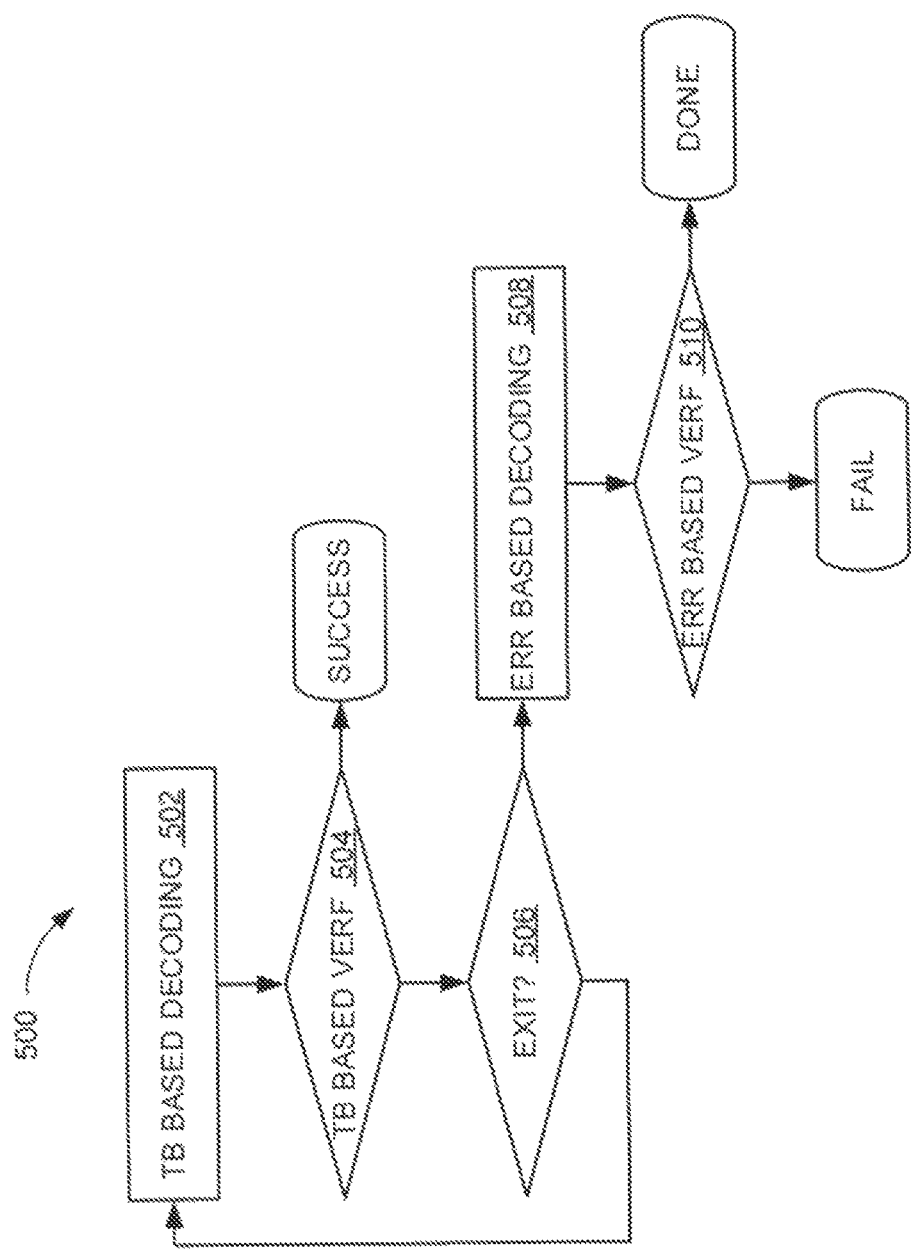
FIG. 5 is an exemplary operational flowchart of the computing system of FIG. 1.

Referring now to FIG. 5, therein is shown an exemplary operational flowchart 500 of the computing system 100 of FIG. 1. The exemplary operational flowchart 500 can describe the direct processing mechanism 228 of FIG. 2. The direct processing mechanism 228 can estimate the content 108 of FIG. 1 using the joint processing mechanism 124 of FIG. 1 after the content-processing mechanism 212 of FIG. 2 for decoding the information portion 116 of FIG. 1 with the error-handling portion 118 of FIG. 1.

The direct processing mechanism 228 can include the joint processing mechanism 124, for decoding the information portion 116 using the error-handling portion 118, implemented after the content-processing mechanism 212. The direct processing mechanism 228 can include the error check adjustment 226 of FIG. 2 for limiting the error check process 126 of FIG. 1 for the joint processing mechanism 124 to only once following the error correction process 128 of FIG. 1 using the error-handling portion 118.

The direct processing mechanism 228 can include a transport block based decoding in a box 502. The transport block based decoding can include the content processing module 404 of FIG. 4 implementing the content-processing mechanism 212 for the error correction process 128.

For example, the box 502 can represent the content processing module 404 decoding for the content 108 using the information portion 116 without the error-handling portion 118. Also for example, the box 502 can represent the content processing module 404 decoding for the content 108 based on processing the information portion 116 according to the formatting mechanism 110 of FIG. 1, such as the turbo processing mechanism 112 of FIG. 1. Details regarding the content processing module 404 have been described above.

The direct processing mechanism 228 can include a transport block based verification in a box 504. The transport block based verification can include the verification module 406 of FIG. 4 implementing the error check process 126.

For example, the box 504 can represent the verification module 406 performing a CRC error check based on the content-processing output 216 of FIG. 2 resulting from the decoding process. Details regarding the verification module 406 have been described above.

The direct processing mechanism 228 can estimate the content 108 or the original code word based on the content-processing output 216 when the verification module 406 indicates passing result or success. The computing system 100 can further include a verify exit condition in a box 506 when the verification module 406 indicates failing result for the transport block based verification as represented in the box 504.

The direct processing mechanism 228 can include an iterative implementation of the content-processing mechanism 212. The direct processing mechanism 228 can repeat the processes as represented in the box 502, the box 504, and the box 506 until the verify exit condition represented in the box 506 indicates a satisfaction of the exit condition, such as reaching a maximum limit for the iterations without passing the error check process 126.

The direct processing mechanism 228 can include an error based decoding in a box 508. The error based decoding can include the joint error-processing module 408 of FIG. 4 implementing the error correction process 128 utilizing the error-handling portion 118. For example, the box 508 can represent CRC decoding, soft input and soft output decoding, decoding using the parity-check parameter 130 of FIG. 1 including or based on the sparse configuration 132 of FIG. 1, or a combination thereof. Details regarding the joint error-processing module 408 have been described above.

The direct processing mechanism 228 can include an error based verification in a box 510. The error based verification represented in the box 510 can be similar to the transport block based verification represented in the box 504, except the box 510 following the error based decoding as represented in the box 508. The error based verification can include the verification module 406 implementing the error check process 126 for the error-decoding output 222 of FIG. 2 from the joint error-processing module 408.

The error check adjustment 226 for the direct processing mechanism 228 can include the error based decoding in the box 508 and the error based verification in the box 510 occurring only once after the end of the content-processing mechanism 212. The computing system 100 can determine success or failure for the overall attempt at estimating the content 108 based on the outcome of the error based verification in the box 510.

It has been discovered that the direct processing mechanism 228 including the error check adjustment 226 for implementing the error correction process 128 using the error-handling portion 118 as described above provides increased achievable throughput, where coding gains are emphasized at high coding rates, short block lengths, or a combination thereof, without affecting the CRC detection capability. The direct processing mechanism 228 for implementing the error correction process 128 using the error-handling portion 118 can increase the achievable throughput based on providing additional information or decoding with the error-handling portion 118. The error check adjustment 226 along with the parity-check parameter 130 including or based on the sparse configuration 132 can ensure that the integrity of the error check process 126 is not compromised from utilizing the error-handling portion 118 for the error correction process 128.

The direct processing mechanism 228 including the error check adjustment 226 can be implemented in or using the first communication unit 316 of FIG. 3, the second communication unit 336 of FIG. 3, the first control unit 312 of FIG. 3, the second control unit 334 of FIG. 3, or a combination thereof. For example, the direct processing mechanism 228 including the error check adjustment 226 can include circuits, wires, paths, gates, chips, functions, instructions, or a combination thereof arranged in according to the direct processing mechanism 228 including the error check adjustment 226 as described above in one or more of the units for the computing system 100.

Figure 6:
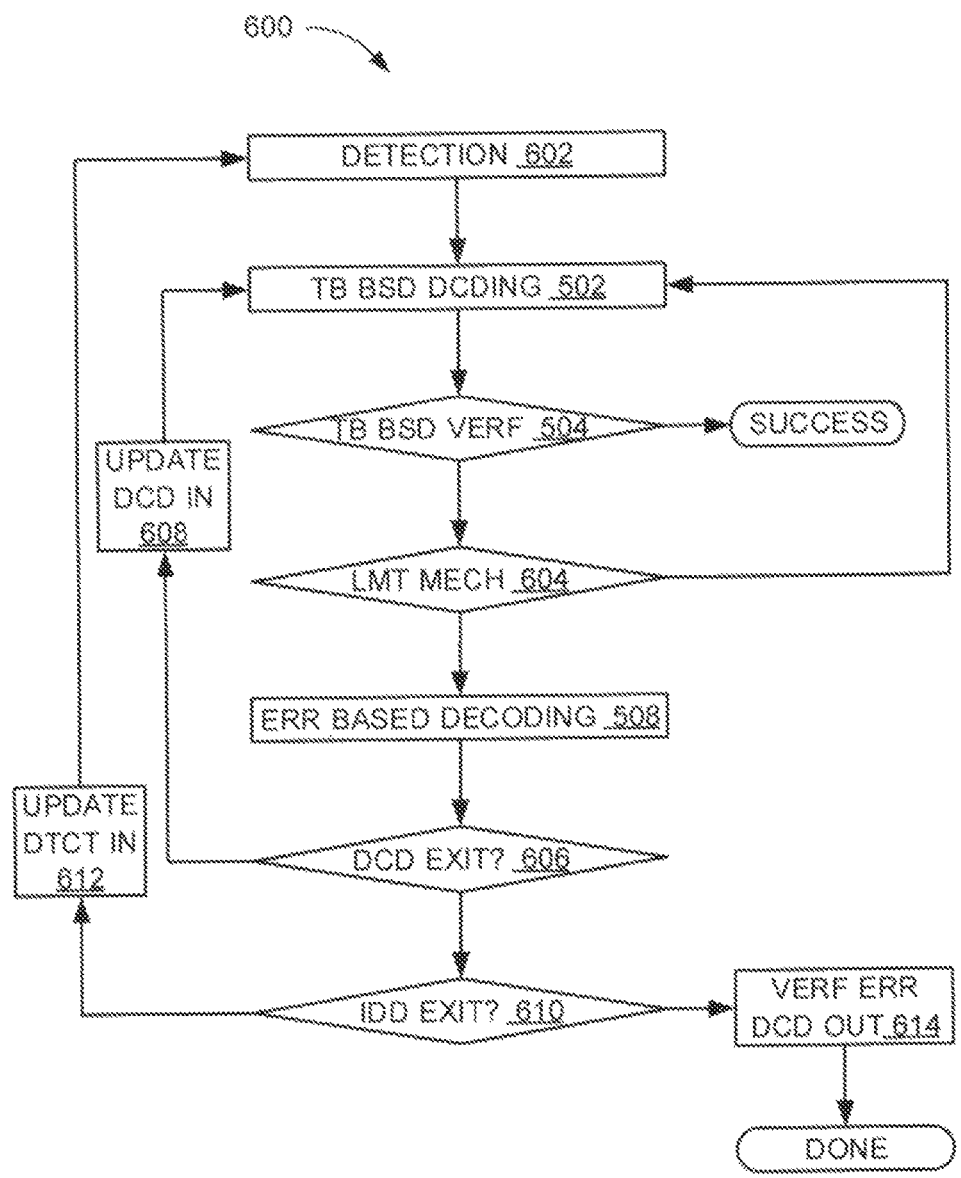
FIG. 6 is a further exemplary operational flowchart of the computing system of FIG. 1.

Referring now to FIG. 6, therein is shown a further exemplary operational flowchart 600 of the computing system 100 of FIG. 1. The further exemplary operational flowchart 600 can describe the joint-update mechanism 230 of FIG. 2. The joint-update mechanism 230 can estimate the content 108 of FIG. 1 using the content-processing mechanism 212 of FIG. 2 integral with the joint processing mechanism 124 of FIG. 1.

The content-processing mechanism 212 can be for iteratively estimating the content 108 from the information portion 116 of FIG. 1 and the joint processing mechanism 124 can be for separately decoding the information portion 116 with the error-handling portion 118 of FIG. 1. The joint-update mechanism 230 can include the joint processing mechanism 124, for decoding the information portion 116 using the error-handling portion 118, implemented in conjunction or integral with the content-processing mechanism 212.

The joint-update mechanism 230 can estimate the content 108 using the joint processing mechanism 124 including the error check process 126 of FIG. 1 based on the error check adjustment 226 of FIG. 2 for limiting the error check process 126 verifying estimation of the content 108 with the error-handling portion 118. The joint-update mechanism 230 can further include various input or initialization information, such as the content-processing output 216 of FIG. 2, based on various output or resulting information, such as the error-decoding output 222 of FIG. 2, for estimating the content 108.

The joint-update mechanism 230 can include detection in a box 602. The computing system 100 can implement detection by detecting the destination signal 122 of FIG. 1 using the content processing module 404 of FIG. 4. Details regarding the content processing module 404 have been described above.

The joint-update mechanism 230 can include the transport block based decoding in the box 502. The transport block based decoding can include the content processing module 404 implementing the content-processing mechanism 212 for the error correction process 128 of FIG. 1. Details regarding the box 502 and the content processing module 404 have been described above.

The joint-update mechanism 230 can include the transport block based verification in the box 504. The transport block based verification can include the verification module 406 of FIG. 4 implementing the error check process 126. Details regarding the box 504 and the verification module 406 have been described above.

The joint-update mechanism 230 can include a limiting mechanism in a box 604. The limiting mechanism can include an implementation or a portion of the error check adjustment 226. The box 604 can include the error check adjustment 226 for verifying an index for indicating iterations for detection, decoding, or a combination thereof.

For example, the error check adjustment 226 for the joint-update mechanism 230 can repeat the processes described in the box 502 and the box 504 based on the iteration not satisfying predetermined threshold. As a more specific example, the error check adjustment 226 for the joint-update mechanism 230 can repeat the processes described in the box 502 and the box 504 when the decoding iteration count is not greater than an arbitrary number predetermined by the computing system 100, such as between 1 and 10.

The joint-update mechanism 230 can include the error based decoding in the box 508. The joint-update mechanism 230 can implement the error based decoding represented in the box 508 based on the error check adjustment 226, such as when the iteration count satisfying the threshold predetermined by the computing system 100. The joint-update mechanism 230 can include the box 508 implemented with the joint error-processing module 408 of FIG. 4. Details regarding the box 508 and the joint error-processing module 408 have been described above.

The joint-update mechanism 230 can include an iterative implementation for decoding, detecting, or a combination thereof processing for the content 108. The joint-update mechanism 230 can include the error check adjustment 226 for eliminating or not including the error check process 126 for the error-decoding output 222 after the error based decoding represented in the box 508.

The joint-update mechanism 230 can include verification of decoding exit in a box 606. The verification of decoding exit can be for stopping iterative decoding process. The iterative decoding process including the content-processing mechanism 212 including the joint processing mechanism 124 can be stopped based on a decoding iteration threshold predetermined by the computing system 100.

The joint-update mechanism 230 can include update decoding input in a box 608. The joint-update mechanism 230 can provide the error-decoding output 222 from the joint error-processing module 408 as the content-processing input 214 of FIG. 2 for the content processing module 404 implementing the content-processing mechanism 212. For example, LLR value representing the extrinsic information or the a-posteriori information represented by the error-decoding output 222 can be used as a-priori information for the decoder as represented by the content-processing input 214.

The joint-update mechanism 230 can provide the error-decoding output 222 as the content-processing input 214 specific for the decoding process when the iterations for the decoding process has not reached the decoding iteration threshold. The joint-update mechanism 230 can repeat processes represented by boxes 502, 504, 604, 508, 606, 608, or a combination thereof until the decoding iteration count satisfies the decoding iteration threshold as considered for the box 606.

The joint-update mechanism 230 can include verification of iterative-detection-decoding (IDD) exit in a box 610. The verification of IDD exit can be for stopping iterative process combining both detection and decoding. The verification of IDD exit represented in the box 610 can be considered when the decoding iteration count satisfies the decoding iteration threshold as considered for the box 606.

The joint-update mechanism 230 can include update detection input in a box 612. The joint-update mechanism 230 can provide the error-decoding output 222 from the joint error-processing module 408 as the content-processing input 214 for the content processing module 404 implementing the content-processing mechanism 212.

For example, LLR value representing the extrinsic information or the a-posteriori information represented by the error-decoding output 222 can be used as a-priori information for the detector as represented by the content-processing input 214. As a more specific example, the joint-update mechanism 230 can update systematic a-posteriori decoder output represented by the content-processing output 216 with CRC output represented by the error-decoding output 222, and feedback the decoder LLR as a-priori information for the detector.

The joint-update mechanism 230 can provide the error-decoding output 222 as the content-processing input 214 specific for the detection process when the iterations for the IDD has not reached an IDD threshold predetermined by the computing system. The joint-update mechanism 230 can repeat processes represented by boxes 602, 502, 504, 604, 508, 606, 608, 610, 612, or a combination thereof until the IDD count satisfies the IDD threshold as considered for the box 610.

The joint-update mechanism 230 can include verification of decoding output in a box 614. The joint-update mechanism 230 can verify the error-decoding output 222 when the IDD count satisfies the IDD threshold. The joint-update mechanism 230 can verify the error-decoding output 222 according to the error check process 126 for the box 614. For example, the joint-update mechanism 230 can implement a CRC check on the CRC decoding output generated based on implementing the error correction process 128 using the error-handling portion 118, such as including the parity-check parameter 130 of FIG. 1 with the sparse configuration 132 of FIG. 1.

The joint-update mechanism 230 can verify the error-decoding output 222 using the verification module 406. Details regarding the verification module 406 have been described above. The error check adjustment for the joint-update mechanism 230 can include verification of the error-decoding output 222 occurring after completion of the IDD process. The computing system 100 can determine success or failure for the overall attempt at estimating the content 108 based on the outcome of the verification of decoding output represented in the box 614.

For the joint-update mechanism 230, the soft-in soft-out CRC decoding can be implemented after a number of initial turbo decoding iterations within the turbo decoding iterative loop according to the box 604. The CRC detection can be deployed on the turbo decoder a posteriori output, and not on the CRC decoder a posteriori output to prevent increase in the CRC detection failure error probability.

The CRC decoder extrinsic soft output can be used to update the a priori input to the first turbo decoder within the turbo decoding iterative loop, where the damped extrinsic CRC decoder output can be added to the de-interleaved second component turbo decoder extrinsic output for the systematic bits, before passing as a priori to the first component turbo decoder. The joint-update mechanism 230 can update the decoding input, as represented in the box 608 according to:

$$A_{1,i} = s\Pi^{-1}(E_{2,i-1}) + \alpha\Lambda^x. \quad \text{Equation (10).}$$

Also for the joint-update mechanism 230 utilizing the IDD architecture, the CRC decoder soft extrinsic output can be used to update the systematic portion of the a posteriori probability turbo decoder output, extrinsic output, or a function of both a posteriori and extrinsic decoder output at each IDD iteration or starting from the second IDD iteration. The CRC decoder soft extrinsic output can be passed as a priori information to the channel detector according to:

$$L'_{APP(sys)} = L_{APP(sys)} + \alpha\Lambda^x. \quad \text{Equation (11).}$$

Further for the joint-update mechanism 230 utilizing the IDD architecture, the decoder soft output can be not updated for the parity symbols. Within each of the IDD iterations, the CRC output can also be used to update the decoder a priori, and CRC detection can be checked after turbo decoding and before CRC decoding as explained above. If all IDD iterations fail, then CRC detection can be tested on the last soft a posteriori CRC decoder output.

It has been discovered that the joint-update mechanism 230 including the error check adjustment 226 for implementing the error correction process 128 using the error-handling portion 118 as described above provides increased achievable throughput, where coding gains are emphasized at high coding rates, short block lengths, or a combination thereof, without affecting the CRC detection capability. The joint-update mechanism 230 for implementing the error correction process 128 using the error-handling portion 118 can increase the achievable throughput based on providing additional information or decoding with the error-handling portion 118.

Further, the error check adjustment 226 along with the parity-check parameter 130 including or based on the sparse configuration 132 can ensure that the integrity of the error check process 126 is not compromised from utilizing the error-handling portion 118 for the error correction process 128. It has also been discovered that the joint-update mechanism 230 can provide increased achievable throughput without affecting the CRC detection capability for iterative processing architectures.

The joint-update mechanism 230 including the error check adjustment 226 can be implemented in or using the first communication unit 316 of FIG. 3, the second communication unit 336 of FIG. 3, the first control unit 312 of FIG. 3, the second control unit 334 of FIG. 3, or a combination thereof. For example, the joint-update mechanism 230 including the error check adjustment 226 can include circuits, wires, paths, gates, chips, functions, instructions, or a combination thereof arranged in according to the joint-update mechanism 230 including the error check adjustment 226 as described above in one or more of the units for the computing system 100.

Figure 7:
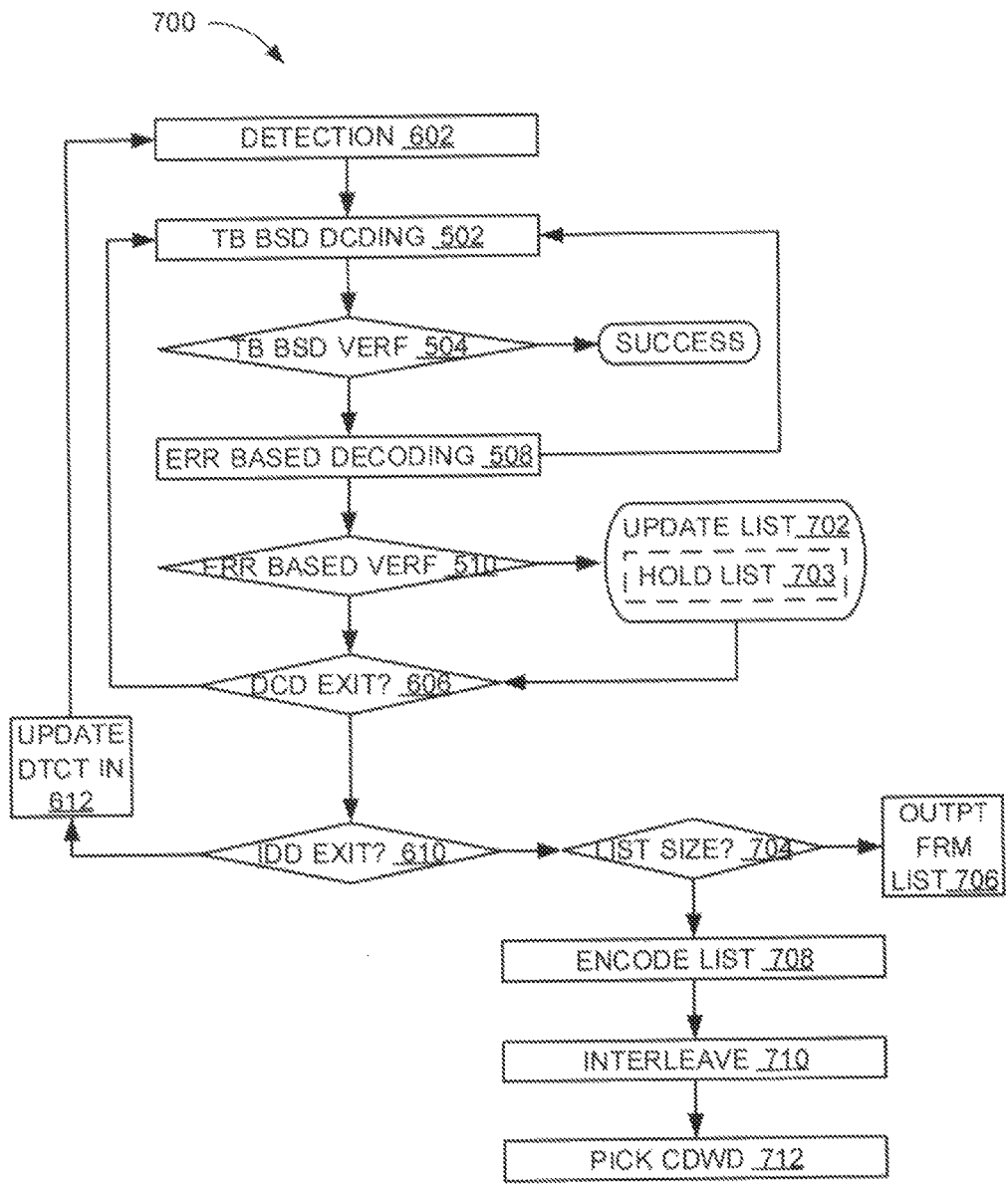
FIG. 7 is an additional exemplary operational flowchart of the computing system of FIG. 1.

Referring now to FIG. 7, therein is shown an additional exemplary operational flowchart 700 of the computing system 100 of FIG. 1. The additional exemplary operational flowchart 700 can describe the list mechanism 232 of FIG. 2. The list mechanism 232 can estimate the content 108 of FIG. 1 using the content-processing mechanism 212 of FIG. 2 integral with the joint processing mechanism 124 of FIG. 1.

The content-processing mechanism 212 can be for iteratively estimating the content 108 from the information portion 116 of FIG. 1 and the joint processing mechanism 124 can be for separately decoding the information portion 116 with the error-handling portion 118 of FIG. 1. The list mechanism 232 can include the joint processing mechanism 124, for decoding the information portion 116 using the error-handling portion 118, implemented in conjunction or integral with the content-processing mechanism 212.

The list mechanism 232 can estimate the content 108 using the joint processing mechanism 124 including the error check process 126 of FIG. 1 based on the error check adjustment 226 of FIG. 2 for limiting the error check process 126 verifying estimation of the content 108 with the error-handling portion 118. The list mechanism 232 can further include various input or initialization information, such as the content-processing output 216 of FIG. 2, based on various output or resulting information, such as the error-decoding output 222 of FIG. 2, for estimating the content 108.

The list mechanism 232 can include detection in the box 602, the transport block based decoding in the box 502, the transport block based verification in the box 504, the error based decoding in the box 508, or a combination thereof similar to the joint-update mechanism 230 of FIG. 6, as described above. The computing system 100 can implement one or more of the processes represented by the box 602, the box 502, the box 504, the box 508, or a combination thereof using the content processing module 404 of FIG. 4, the verification module 406 of FIG. 4, the joint error-processing module 408 of FIG. 4, or a combination thereof. Details regarding the box 602, the box 502, the box 504, the box 508, the content processing module 404, the verification module 406, the joint error-processing module 408, or a combination thereof have been described above.

The list mechanism 232 can include error based verification in the box 510 as described above for the direct processing mechanism 228 of FIG. 5. The error based verification can include the verification module 406 implementing the error check process 126 following decoding of the information portion 116 through the error correction process 128 of FIG. 1 utilizing the error-handling portion 118. Details regarding the box 510 and the verification module 406 have been described above.

The list mechanism 232 can include update list in a box 702. The list mechanism 232 can include a holding list 703. The holding list 703 can include memory or stored information corresponding to decoding results.

For example, the holding list 703 can include one or more instance of the error-decoding output 222, the content-processing output 216, or a combination thereof. As a more specific example, the holding list 703 can include decoding outputs corresponding to an instance of the code word, a specific iteration for processing a specific code word, or a combination thereof.

The list mechanism 232 can implement the holding list 703 in a variety of ways. For example, the holding list 703 can be implemented using a buffer, a table, dynamic memory, or a combination thereof.

The list mechanism 232 can update the holding list 703 to include the error-decoding output 222 for implementing update list as represented by the box 702. The list mechanism 232 can update the holding list 703 when the verification module 406 implementing the error check process 126, as represented in the box 510, indicates that the error-decoding output 222 passes or satisfies the error check process 126.

The list mechanism 232 can include the error check adjustment 226 for implementing the error check process 126 for the error-decoding output 222 during iteratively implementing the content-processing mechanism 212. The list mechanism 232 can include the error check adjustment 226 for storing the passing or satisfactory instance of the error-decoding output 222 to the holding list 703 while continuing with iterative decoding process, the IDD process, or a combination thereof as represented by the content-processing mechanism 212.

The list mechanism 232 can include the verification of decoding exit in the box 606. The verification of decoding exit can be for stopping iterative decoding process as described above in FIG. 6. The list mechanism 232 can implement the box 606 after updating the holding list 703 as represented in the box 702. The list mechanism 232 can also implement the box 606 without updating the holding list 703 when the verification module 406 implementing the error check process 126, as represented in the box 510, indicates that the error-decoding output 222 fails the error check process 126.

The list mechanism 232 can repeat processes represented by boxes 502, 504, 508, 510, 702, 606, or a combination thereof until the decoding iteration count satisfies the decoding iteration threshold as considered for the box 606. The list mechanism 232 can include the verification of IDD exit in the box 610 as described in FIG. 6. The list mechanism 232 can further include the update detection input in the box 612 as described in FIG. 6. The list mechanism 232 can repeat processes represented by boxes 602, 502, 504, 508, 510, 702, 606, 610, 612, or a combination thereof until the IDD count satisfies the IDD threshold as considered for the box 610.

The list mechanism 232 can include verify list size in a box 704. The list mechanism 232 can verify list size by determining a count or a quantity of data or entries in the holding list 703. The list mechanism 232 can compare the count or the quantity in the holding list 703 to a threshold count predetermined by the computing system 100.

The list mechanism 232 can include output from list in a box 706. The list mechanism 232 can implement the output from list by utilizing the error-decoding output 222 in the holding list 703 for estimating the content 108. The list mechanism 232 can implement the box 706 based on the threshold count, such as when the holding list 703 includes one entry or instance of the error-decoding output 222.

The list mechanism 232 can include the encode list in a box 708. The list mechanism 232 can implement the encode list by encoding each vector or instance of the error-decoding output 222 in the holding list 703. The list mechanism 232 can implement the box 708 based on the threshold count, such as when the holding list 703 includes more than one entry or instance of the error-decoding output 222. The list mechanism 232 can encode using the formatting mechanism 110 of FIG. 1.

The list mechanism 232 can include interleave in a box 710. The list mechanism 232 can implement the interleaving process by interleaving or rearranging the encoded entries or information in the holding list 703. The list mechanism 232 can implement the box 710 according to the formatting mechanism 110.

The list mechanism 232 can include pick code-word in a box 712. The list mechanism 232 can implement the picking process by selecting the output instance of the code word with maximum LLR reliability using last detector output. The list mechanism 232 can select the code word as one encoded and interleaved instance of the entries within the holding list 703.

The list mechanism 232 can include the error check adjustment 226 additionally managing the holding list 703. The list mechanism 232 can include the processes described in the boxes 704, 706, 708, 710, 712, or a combination thereof for managing the holding list 703 and determining the code word representing the estimate of the content 108.

For the list mechanism 232, CRC soft decoding can be used to generate a list of Turbo code-words iteratively. To iteratively generate the list of code-words in the holding list 703, CRC decoding can be deployed on the Turbo decoder a posteriori output after each of the Turbo decoding iterations when the CRC detection test on the Turbo decoder output fails. CRC detection can be then tested again on the CRC decoder soft a posteriori output, and appended to holding list 703 when the hard-decision word passes the CRC test.

Although, the CRC detection test can be deployed after both the Turbo decoder and the CRC decoder, decoding can terminate when the CRC detection on the Turbo decoder output passes the test, or the maximum number of turbo decoding iterations is reached. This combination of processes can prevent an increase in the CRC detection failure probability. For the remaining iterations, whenever a new hard decision vector from the CRC decoder output passes the CRC detection test, the word can be appended to holding list 703 without decoding termination.

After all turbo decoding iterations are exhausted without CRC detection on the turbo decoder output passes, the code word on holding list 703 with highest likelihood value can be chosen as output. To find the maximum likelihood (ML) turbo code word, each of the hard-decision vectors on the holding list 703 can be encoded into a turbo code word, followed by proper interleaving and rate-matching. Then the reliability of each code word on the holding list 703 can be measured against the channel detector output LLRs, or a last instance thereof.

The list mechanism 232 can measure according to:

$$\lambda_i = \Sum_{i=1}^{N}(2\mathcal{T}(c_l)_i)\chi_i.$$  Equation (12).

The term 'N' can represent the total number of bits after rate matching. The term '(2 T(c)−1)' can represent sign of the encoded rate-matched code word. The extrinsic output of channel detector 602 for bit 'i' can be represented as $\chi_i$. The list mechanism 232 can select the code word associated with or resulting in the largest ML metric from the holding list 703.

It has been discovered that the list mechanism 232 including the error check adjustment 226 for implementing the error correction process 128 using the error-handling portion 118 as described above provides increased achievable throughput, where coding gains are emphasized at high coding rates, short block lengths, or a combination thereof, without affecting the CRC detection capability. The list mechanism 232 for implementing the error correction process 128 using the error-handling portion 118 can increase the achievable throughput based on providing additional information or decoding with the error-handling portion 118.

Further, the error check adjustment 226 along with the parity-check parameter 130 of FIG. 1 including or based on the sparse configuration 132 of FIG. 1 can ensure that the integrity of the error check process 126 is not compromised from utilizing the error-handling portion 118 for the error correction process 128. It has also been discovered that the list mechanism 232 can provide increased achievable throughput without affecting the CRC detection capability for iterative processing architectures.

The list mechanism 232 including the error check adjustment 226 can be implemented in or using the first communication unit 316 of FIG. 3, the second communication unit 336 of FIG. 3, the first control unit 312 of FIG. 3, the second control unit 334 of FIG. 3, or a combination thereof. For example, the list mechanism 232 including the error check adjustment 226 can include circuits, wires, paths, gates, chips, functions, instructions, or a combination thereof arranged in according to the list mechanism 232 including the error check adjustment 226 as described above in one or more of the units for the computing system 100.

Figure 8:
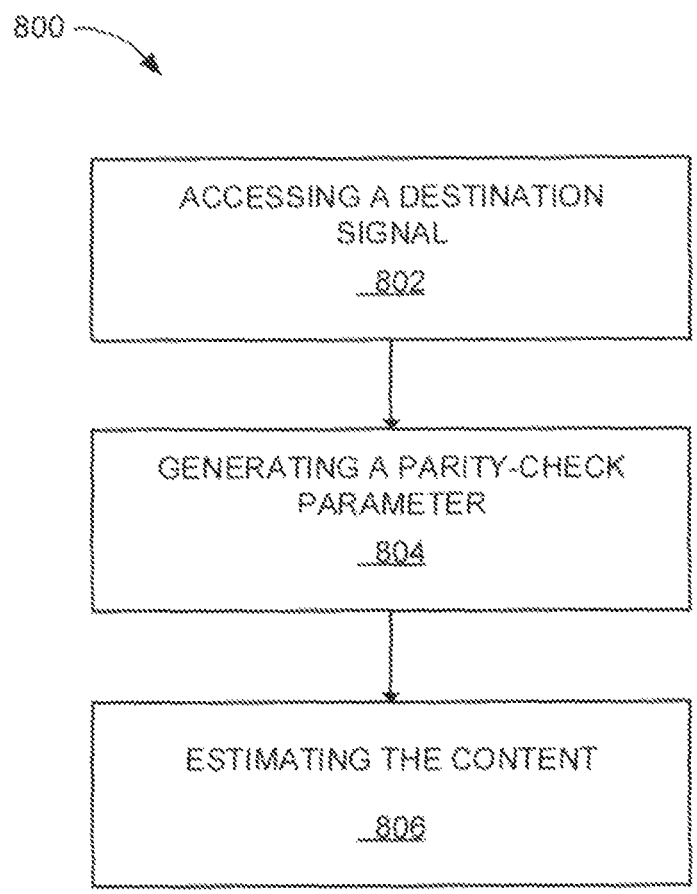
FIG. 8 is a flow chart of a method of operation of a computing system in a further embodiment of the present invention.

Referring now to FIG. 8, therein is shown a flow chart 800 of a method of operation of a computing system in a further embodiment of the present invention. The method 800 includes: accessing a destination signal including an information portion for representing a content and an error-handling portion for describing the information portion relative to the content in a block 802; generating a parity-check parameter based on a sparse configuration from the destination signal in a block 804; and estimating the content based on decoding the information portion using the error-handling portion and the parity-check parameter in a block 806.

The modules described in this application can be hardware implementation or hardware accelerators, including passive circuitry, active circuitry, or both, in the first communication unit 316 of FIG. 3, the second communication unit 336 of FIG. 3, the first control unit 312 of FIG. 3, the second control unit 338 of FIG. 3, or a combination thereof. The modules can also be hardware implementation or hardware accelerators, including passive circuitry, active circuitry, or both, within the first device 102 of FIG. 1, the second device 106 of FIG. 1, or a combination thereof but outside of the first communication unit 316, the second communication unit 336, the first control unit 312, the second control unit 334, or a combination thereof.

The computing system 100 of FIG. 1 has been described with module functions or order as an example. The computing system 100 can partition the modules differently or order the modules differently. For example, the access module 402 of FIG. 4 and the content processing module 404 can be combined. Also for example, the verification module 406 can be separated into two modules, one following the content processing module 404 and the other following the joint error-processing module 408 of FIG. 4.

For illustrative purposes, the various modules have been described as being specific to the first device 102, the second device 106, or a combination thereof. However, it is understood that the modules can be distributed differently. For example, the various modules can be implemented in a different device, or the functionalities of the modules can be distributed across multiple devices. Also as an example, the various modules can be stored in a non-transitory memory medium.

As a more specific example, one or more modules described above can be stored in the non-transitory memory medium for distribution to a different system, a different device, a different user, or a combination thereof, for manufacturing, or a combination thereof. Also as a more specific example, the modules described above can be implemented or stored using a single hardware unit, such as a chip or a processor, or across multiple hardware units.

The modules described in this application can be stored in the non-transitory computer readable medium. The first communication unit 316, the second communication unit 336, the first control unit 312, the second control unit 334, or a combination thereof can represent the non-transitory computer readable medium. The first communication unit 316, the second communication unit 336, the first control unit 312, the second control unit 334, or a combination thereof, or a portion therein can be removable from the first device 102, the second device 106, or a combination thereof. Examples of the non-transitory computer readable medium can be a non-volatile memory card or stick, an external hard disk drive, a tape cassette, or an optical disk.

The physical transformation of the destination signal 122 of FIG. 1 from the error correction process 128 of FIG. 1 using the error-handling portion 118 of FIG. 1 with the sparse configuration 132 of FIG. 1 results in the movement in the physical world, such as content displayed or recreated for the user on the first user device from processing the serving content therein. The content reproduced on the first user device 102, such as navigation information or voice signal of a caller, can influence the user's movement, such as following the navigation information or replying back to the caller. Movement in the physical world results in changes to the channel measures, the geographic location of the first user device 102, interfering transmissions, or a combination thereof, which can be fed back into the computing system 100 and influence the parity-check parameter 130 of FIG. 1 and the error-decoding output 222 of FIG. 2.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computing system comprising:
   an inter-device interface configured to access a destination signal including an information portion for representing a content and an error-handling portion for describing the information portion relative to the content;
   a digital signal processor including microelectronics, coupled to the inter-device interface, configured to:
   (i) generate a content-processing output using a content processing module, based on decoding the destination signal utilizing the information portion;
   (ii) perform a first cyclic-redundancy error check based on the content-processing output;
   perform an error check adjustment by repeating (i) and (ii) based on a first iteration count, wherein the error check adjustment is performed until the first iteration count satisfies a predetermined threshold;
   generate an error-decoding output based on the error check adjustment, wherein the error-decoding output is calculated using the error-handling portion and a parity-check parameter generated based on a sparse configuration from the destination signal;
   provide the error-decoding output as a content-processing input of the content processing module for decoding the destination signal based on a second iteration count, wherein the error-decoding output is provided as the content-processing input until the second iteration count satisfies a decoding iteration threshold;
   provide the error-decoding output as the content-processing input of the content processing module for detecting the destination signal based on a third iteration count, wherein the error-decoding output is provided as the content-processing input until the third iteration count satisfies an iterative-detection-decoding threshold;
   verify the error-decoding output by performing a second cyclic-redundancy error check on the error-decoding output when the third iteration count satisfies the iterative-detection-decoding threshold; and
   estimate the content based on the verified error-decoding output.

2. The system as claimed in claim 1 wherein the digital signal processor is configured to decode the information portion using a low-intensity decoding mechanism with the parity-check parameter based on the sparse configuration.

3. The system as claimed in claim 1 wherein the digital signal processor is configured to:
   generate a sparse-format input including the sparse configuration based on the information portion of the destination signal; and
   generate the parity-check parameter based on the sparse-format input.

4. The system as claimed in claim 1 wherein the digital signal processor is configured to:
   calculate the error-decoding output based on decoding the information portion with the error-handling portion; and
   calculate the content-processing output based on the error-decoding output for estimating the content.

5. The system as claimed in claim 1 wherein the digital signal processor is configured to:
   generate an error-portion code-word based on generator polynomials associated with generating the error-handling portion; and
   generate the parity-check parameter based on the error-portion code-word.

6. The system as claimed in claim 1 wherein the digital signal processor is configured to estimate the content using a damped-belief propagation mechanism for decoding the information portion with the error-handling portion and the parity-check parameter based on the sparse configuration.

7. A method of operation of a computing system comprising:
   accessing a destination signal, with an inter-device interface, including an information portion for representing a content and an error-handling portion for describing the information portion relative to the content; and
   with a digital signal processor:
   (i) generating a content-processing output using a content processing module, based on decoding the destination signal utilizing the information portion;
   (ii) performing a first cyclic-redundancy error check based on the content-processing output;
   performing an error check adjustment by repeating (i) and (ii) based on a first iteration count, wherein the error check adjustment is performed until the first iteration count satisfies a predetermined threshold;
   generating an error-decoding output based on the error check adjustment, wherein the error-decoding output is calculated using the error-handling portion and a parity-check parameter generated based on a sparse configuration from the destination signal;
   providing the error-decoding output as a content-processing input of the content processing module for decoding the destination signal based on a second iteration count, wherein the error-decoding output is provided as the content-processing input until the second iteration count satisfies a decoding iteration threshold;
   providing the error-decoding output as the content-processing input of the content processing module for detecting the destination signal based on a third iteration count, wherein the error-decoding output is provided as the content-processing input until the third iteration count satisfies an iterative-detection-decoding threshold;

verifying the error-decoding output by performing a second cyclic-redundancy error check on the error-decoding output when the third iteration count satisfies the iterative-detection-decoding threshold;
estimating the content based on the verified error-decoding output.

8. The method as claimed in claim 7 wherein estimating the content includes decoding the information portion using a low-intensity decoding mechanism with the parity-check parameter based on the sparse configuration.

9. The method as claimed in claim 7 wherein generating the parity-check parameter includes:
generating a sparse-format input including the sparse configuration based on the information portion of the destination signal; and
generating the parity-check parameter based on the sparse-format input.

10. A non-transitory computer readable medium including instructions for a computing system comprising:
accessing a destination signal including an information portion for representing a content and an error-handling portion for describing the information portion relative to the content;
(i) generating a content-processing output using a content processing module, based on decoding the destination signal utilizing the information portion;
(ii) performing a first cyclic-redundancy error check based on the content-processing output;
performing an error check adjustment by repeating (i) and (ii) based on a first iteration count, wherein the error check adjustment is performed until the first iteration count satisfies a predetermined threshold;
generating an error-decoding output based on the error check adjustment, wherein the error-decoding output is calculated using the error-handling portion and a parity-check parameter generated based on a sparse configuration from the destination signal;
providing the error-decoding output as a content-processing input of the content processing module for decoding the destination signal based on a second iteration count, wherein the error-decoding output is provided as the content-processing input until the second iteration count satisfies a decoding iteration threshold;
providing the error-decoding output as the content-processing input of the content processing module for detecting the destination signal based on a third iteration count, wherein the error-decoding output is provided as the content-processing input until the third iteration count satisfies an iterative-detection-decoding threshold;
verifying the error-decoding output by performing a second cyclic-redundancy error check on the error-decoding output when the third iteration count satisfies the iterative-detection-decoding threshold; and
estimating the content based on the verified error-decoding output.

11. The non-transitory computer readable medium as claimed in claim 10 wherein estimating the content includes decoding the information portion using a low-intensity decoding mechanism with the parity-check parameter based on the sparse configuration.

12. The non-transitory computer readable medium as claimed in claim 10 wherein generating the parity-check parameter includes:
generating a sparse-format input including the sparse configuration based on the information portion of the destination signal; and
generating the parity-check parameter based on the sparse-format input.

* * * * *